US009253454B2

(12) United States Patent
Hobbs et al.

(10) Patent No.: US 9,253,454 B2
(45) Date of Patent: **\*Feb. 2, 2016**

(54) MOBILE WELLSITE MONITORING

(71) Applicant: OCCIDENTAL PERMIAN LTD., Houston, TX (US)

(72) Inventors: Kirk Hobbs, Midland, TX (US); Terrell Rowe, Midland, TX (US); Judy Sisson, Brownfield, TX (US)

(73) Assignee: Occidental Permian, LTD, Houston, TX (US)

( * ) Notice: Subject to any disclaimer, the term of this patent is extended or adjusted under 35 U.S.C. 154(b) by 509 days.

This patent is subject to a terminal disclaimer.

(21) Appl. No.: 13/682,011

(22) Filed: Nov. 20, 2012

(65) Prior Publication Data
US 2013/0076907 A1 Mar. 28, 2013

Related U.S. Application Data

(63) Continuation of application No. 12/648,820, filed on Dec. 29, 2009, now Pat. No. 8,326,538.

(60) Provisional application No. 61/141,507, filed on Dec. 30, 2008.

(51) Int. Cl.
*G06F 11/30* (2006.01)
*G08C 17/02* (2006.01)
(Continued)

(52) U.S. Cl.
CPC .............. *H04N 7/185* (2013.01); *E21B 47/12* (2013.01); *G06Q 10/06393* (2013.01);
(Continued)

(58) Field of Classification Search
USPC .......... 73/152.01, 432.1, 865.8, 865.9, 866.3; 175/40; 280/29, 79.11; 340/500, 531, 340/539.1, 539.22, 540, 679, 870.01, 340/870.07, 870.09, 870.16; 348/61, 143, 348/158; 356/256; 382/100; 702/1, 2, 6, 11, 702/33, 34, 127, 182, 187, 188, 189; 705/1.1, 7.11, 7.38, 7.39; 708/100, 708/105, 200
See application file for complete search history.

(56) References Cited

U.S. PATENT DOCUMENTS 2,883,255 A * 4/1959 Anderson ........................ 346/34
3,321,613 A * 5/1967 Searle ............................ 702/182
(Continued)

FOREIGN PATENT DOCUMENTS

CN 1181450 A 5/1998
GB 2434718 A 8/2007
(Continued)

OTHER PUBLICATIONS

Notification of Transmittal of the International Search Report and the Written Opinion of the International Search Authority, or Declaration (3 pages); International Search Report (5 pages); and Written Opinion of the International Search Authority (5 pages), mailed Mar. 18, 2010, for related International Application.

*Primary Examiner* — Edward Cosimano
(74) *Attorney, Agent, or Firm* — Renner, Kenner; Arthur M. Reginelli

(57) ABSTRACT

Methods for monitoring a wellsite include transporting a mobile monitoring platform to a wellsite. The mobile monitoring platform includes a transportable chassis including two or more wheels; a mast supported by the platform and extendable vertically upward from the chassis; a transceiver including a wireless modem and an antenna; a controller adapted to communicate with the transceiver; and a power module electrically coupled to at least one of the transceiver and the processor. The methods include wirelessly receiving, at the transceiver, wellsite data from a plurality of sensors at or adjacent the wellsite; and wirelessly transmitting, in real-time, the wellsite data to a remote monitoring station.

20 Claims, 12 Drawing Sheets

(51) Int. Cl.
*H04Q 9/00* (2006.01)
*G06F 17/40* (2006.01)
*G06F 19/00* (2011.01)
*G01M 99/00* (2011.01)
*H04N 7/18* (2006.01)
*E21B 47/12* (2012.01)
*G06Q 10/06* (2012.01)

(52) U.S. Cl.
CPC ............... *G08C 17/02* (2013.01); *H04Q 9/00* (2013.01); *G01M 99/00* (2013.01); *G06F 11/30* (2013.01); *G06F 17/40* (2013.01); *G06F 19/00* (2013.01); *H04Q 2209/40* (2013.01)

(56) References Cited

U.S. PATENT DOCUMENTS

| | | | |
|---|---|---|---|
| 3,588,804 A | 6/1971 | Fort | |
| 6,106,561 A | 8/2000 | Farmer | |
| 6,728,638 B2 | 4/2004 | Newman | |
| 6,826,492 B2 | 11/2004 | Newman | |
| 6,963,278 B2 | 11/2005 | Frame | |
| 7,006,920 B2 | 2/2006 | Newman | |
| 7,064,677 B2 | 6/2006 | Newman | |
| 7,140,434 B2 | 11/2006 | Chouzenoux | |
| 7,463,986 B2 * | 12/2008 | Hayes | 702/62 |
| 8,134,942 B2 * | 3/2012 | Messinger et al. | 370/311 |
| 8,223,744 B2 * | 7/2012 | Goldberg et al. | 370/350 |
| 8,326,538 B2 * | 12/2012 | Hobbs et al. | 702/6 |
| 2003/0196798 A1 * | 10/2003 | Newman | 166/250.01 |
| 2004/0010587 A1 | 1/2004 | Altamirano | |
| 2004/0073455 A1 * | 4/2004 | McConnochie et al. | 705/2 |
| 2004/0196032 A1 | 10/2004 | Newman | |
| 2004/0231851 A1 | 11/2004 | Silvers | |
| 2005/0114001 A1 | 5/2005 | Newman | |
| 2005/0199388 A1 | 9/2005 | Newman | |
| 2006/0017809 A1 | 1/2006 | Carroll | |
| 2006/0163545 A1 | 7/2006 | Newman | |
| 2006/0219438 A1 | 10/2006 | Moore | |
| 2006/0235573 A1 | 10/2006 | Guion | |
| 2006/0259933 A1 | 11/2006 | Fishel | |
| 2006/0271314 A1 * | 11/2006 | Hayes | 702/62 |
| 2007/0056727 A1 | 3/2007 | Newman | |
| 2007/0056746 A1 | 3/2007 | Newman | |
| 2007/0056811 A1 | 3/2007 | Newman | |
| 2007/0062692 A1 | 3/2007 | Estevez | |
| 2008/0154510 A1 | 6/2008 | Scott | |
| 2010/0008272 A1 * | 1/2010 | Messinger et al. | 370/311 |
| 2010/0250139 A1 * | 9/2010 | Hobbs et al. | 702/6 |
| 2011/0222449 A1 * | 9/2011 | Goldberg et al. | 370/311 |
| 2012/0019671 A1 * | 1/2012 | Goldberg et al. | 348/207.1 |

FOREIGN PATENT DOCUMENTS

| | | |
|---|---|---|
| JP | 09051453 | 2/1997 |
| WO | WO 2010/078350 A1 * | 7/2010 |

\* cited by examiner

Global Monitoring and Control

Home | Settings | Logout
CENTRAL - Wellsite #1 - Documents
Link to this page

⊕ Upload New Document | ⊖ Delete Selected

| Name | Description | ▼ Category | Type | File Size | Uploaded On | | |
|---|---|---|---|---|---|---|---|
| Thursday.wmv | | Elapsed Video | WMV | 4.6 MB | Jul 30, 2009 6:26:13 AM | download | edit |
| Friday.wmv | | Elapsed Video | WMV | 1.8 MB | Jul 31, 2009 6:15:12 AM | download | edit |
| Saturday.wmv | | Elapsed Video | WMV | 6.7 KB | Aug 1, 2009 6:00:22 AM | download | edit |
| Sunday.wmv | | Elapsed Video | WMV | 6.7 KB | Aug 2, 2009 6:00:22 AM | download | edit |
| Monday.wmv | | Elapsed Video | WMV | 6.7 KB | Aug 3, 2009 6:00:19 AM | download | edit |
| Tuesday.wmv | | Elapsed Video | WMV | 6.7 KB | Aug 4, 2009 6:00:38 AM | download | edit |
| Wednesday.wmv | | Elapsed Video | WMV | 81.7 KB | Aug 5, 2009 6:00:22 AM | download | edit |
| Thursday.wmv | | Elapsed Video | WMV | 6.7 KB | Aug 6, 2009 6:00:41 AM | download | edit |
| Friday.wmv | | Elapsed Video | WMV | 6.7 KB | Aug 7, 2009 6:00:41 AM | download | edit |
| Saturday.wmv | | Elapsed Video | WMV | 4.7 MB | Aug 8, 2009 6:27:53 AM | download | edit |
| Sunday.wmv | | Elapsed Video | WMV | 7.4 MB | Aug 9, 2009 6:11:21 AM | download | edit |
| Monday.wmv | | Elapsed Video | WMV | 7.2 MB | Aug 10, 2009 6:16:48 AM | download | edit |
| Tuesday.wmv | | Elapsed Video | WMV | 5.3 MB | Aug 11, 2009 6:17:50 AM | download | edit |
| Wednesday.wmv | | Elapsed Video | WMV | 6.5 MB | Aug 12, 2009 6:12:07 AM | download | edit |
| Thursday.wmv | | Elapsed Video | WMV | 6.2 MB | Aug 13, 2009 6:20:28 AM | download | edit |
| Friday.wmv | | Elapsed Video | WMV | 5.9 MB | Aug 14, 2009 6:12:51 AM | download | edit |
| Saturday.wmv | | Elapsed Video | WMV | 5.6 MB | Aug 15, 2009 6:15:04 AM | download | edit |
| Sunday.wmv | | Elapsed Video | WMV | 5.3 MB | Aug 16, 2009 6:15:32 AM | download | edit |
| Monday.wmv | | Elapsed Video | WMV | 0 bytes | Aug 17, 2009 6:20:34 AM | download | edit |
| Tuesday.wmv | | Elapsed Video | WMV | 0 bytes | Aug 18, 2009 6:14:35 AM | download | edit |
| Wednesday.wmv | | Elapsed Video | WMV | 6.4 MB | Aug 19, 2009 6:17:08 AM | download | edit |
| Thursday.wmv | | Elapsed Video | WMV | 6.3 MB | Aug 20, 2009 6:16:49 AM | download | edit |
| Friday.wmv | | Elapsed Video | WMV | 5.8 MB | Aug 21, 2009 6:17:41 AM | download | edit |

FIG. 9

MOBILE WELLSITE MONITORING

CLAIM OF PRIORITY

This application claims priority under 35 U.S.C. §119(e) to U.S. Provisional Patent Application Ser. No. 61/141,507, filed on Dec. 30, 2008, the entire contents of which are hereby incorporated by reference.

TECHNICAL BACKGROUND

This disclosure relates to wellsite monitoring and, more particularly, to wellsite monitoring utilizing a mobile monitoring platform communicatively coupled to a remote monitoring station and accessible via a communication network, such as the Internet.

BACKGROUND

A wellsite, which often includes a well service rig, drilling equipment, logging equipment, and other completion equipment, is often located far from population centers and in remote rural areas. Often, it may be difficult to supply equipment, tools, and man power to such wellsites as well as remove the equipment and tools once. Even more difficult maybe the gathering of data, information, and status updates from wellsites because of their remote locations. For example, well sites are often located on large, remote tracts of land, which have little or no access to communication techniques such as telephones, Internet-based platforms, and electronic mail. Overcoming such difficulties in communication may be advantageous, because updating current wellsite information, such as ongoing job status, weather data, and rig location and information, may provide a more cost-efficient drilling and completion experience.

Moreover, up-to-date or real-time information is often unavailable from a wellsite due to its remote location. Such information, however, may allow costly mistakes and errors to be prevented. For instance, real-time updating of drilling status may eliminate or help eliminate errors in directional drilling, logging, or production process. In addition, other wellsite operations, such as wellsite servicing operations, workover operations, well and wellsite maintenance, well enhancement, TA/PA operations, and other wellsite operations like rigless wellsite work and general wellsite security surveillance may be monitored in real-time.

In addition, although many wells are drilled and/or maintained throughout the world year-by-year, each wellsite experience may be unique. Lessons learned on previous well sites, however, may allow for better drilling or completion techniques in future operations. By analyzing historical drilling data, or historical logging or completion data, a driller, wellsite operator, or production company may help eliminate waste and provide for more efficient future operations. Such historical data may be difficult to obtain, however, due to the remote location of each wellsite.

SUMMARY

In one general embodiment, a method for monitoring a wellsite includes transporting a mobile monitoring platform to a wellsite. The mobile monitoring platform includes a transportable chassis including two or more wheels; a mast supported by the platform and extendable vertically upward from the chassis; a transceiver including a wireless modem and an antenna; a controller adapted to communicate with the transceiver; and a power module electrically coupled to at least one of the transceiver and the processor. The method includes wirelessly receiving, at the transceiver, wellsite data from a plurality of sensors at or adjacent the wellsite; and wirelessly transmitting, in real-time, the wellsite data to a remote monitoring station.

In another general embodiment, a method for remotely monitoring a wellsite includes receiving at a remote monitoring station in real-time, via a wireless communication link, a plurality of measured wellsite values wirelessly received at a mobile monitoring platform at or adjacent a wellsite. The mobile monitoring platform includes a transportable chassis including two or more wheels; a mast supported by the platform and extendable vertically upward from the chassis; a transceiver including a wireless modem and an antenna; a controller adapted to communicate with the transceiver; and a power module electrically coupled to at least one of the transceiver and the processor. The method includes classifying each of the plurality of measure values into a wellsite image, a wellsite environmental data, and a wellsite operation data; and displaying the classified values at the remote monitoring station substantially simultaneously to receiving the measure wellsite values from the mobile platform.

In one or more aspects of one or more general embodiments, a method may include wirelessly receiving a wellsite job status value at the mobile monitoring platform; and wirelessly transmitting, in a real-time, the wellsite job status value from the mobile monitoring platform to the remote monitoring station.

In one or more aspects of one or more general embodiments, wirelessly receiving a wellsite job status value at the mobile monitoring platform may include receiving a wellsite job status at a mobile user device communicatively coupled to the mobile monitoring platform; and wirelessly transmitting the received wellsite job status from the mobile user device to the mobile monitoring platform.

In one or more aspects of one or more general embodiments, receiving a wellsite job status at a mobile user device communicatively coupled to the mobile monitoring platform may include receiving, through a scanned bar code indicative of a wellsite job status, the wellsite job status at a mobile user device communicatively coupled to the mobile monitoring platform.

In one or more aspects of one or more general embodiments, wellsite data may include one or more wellsite images; wellsite environmental data; and wellsite operation data.

In one or more aspects of one or more general embodiments, a method may further include capturing at least one wellsite image of at least a portion of the wellsite at the mobile monitoring platform with a camera; and wirelessly transmitting, in real-time, the image from the mobile monitoring platform to the remote monitoring station.

In one or more aspects of one or more general embodiments, the image may be a first image and the method may further include receiving, from the remote monitoring station, a command at the mobile monitoring platform to adjust the camera; adjusting the camera based on the command; capturing a second image distinct from the first image of at least a portion of the wellsite at the mobile monitoring platform with the camera; and wirelessly transmitting, in real-time, the second image from the mobile monitoring platform to the remote monitoring station.

In one or more aspects of one or more general embodiments, the one or more images may include one of: a still video image; a live video image; and an infrared image.

In one or more aspects of one or more general embodiments, the wellsite environmental data may include at least two of: a wind velocity; a wind direction; an ambient air temperature; and a relative humidity.

In one or more aspects of one or more general embodiments, the wellsite operation data may include at least two of a wireless transmission signal strength measured by at least one of the transceiver and the controller; a mobile monitoring platform power capacity; a hydrogen sulfide ($H_2S$) level; a hoist load weight; a tong event pressure; a well pressure; a flow rate; and one or more fluid properties.

In one or more aspects of one or more general embodiments, a method may further include monitoring the $H_2S$ level at or adjacent a wellbore; determining, at the mobile monitoring platform, that the $H_2S$ level at or adjacent the wellbore exceeds a predetermined level; and providing at least one of a visual and auditory alarm at the mobile monitoring platform indicative of the $H_2S$ level exceeding the predetermined level.

In one or more aspects of one or more general embodiments, a method may further include wirelessly transmitting, in real-time, a signal indicative of the $H_2S$ level exceeding the predetermined level from the mobile monitoring platform to the remote monitoring station.

In one or more aspects of one or more general embodiments, a method may further include receiving solar energy at the mobile monitoring platform; converting, with the power module, the solar energy to electrical power; and providing the electrical power to the mobile monitoring platform.

In one or more aspects of one or more general embodiments, the wellsite may be a first wellsite and a method may further include transporting the mobile monitoring platform from the first wellsite to a second wellsite; wirelessly receiving wellsite data from the second wellsite at the mobile platform from a plurality of corresponding sensors at or adjacent the second wellsite; and wirelessly transmitting, in real-time, the wellsite data from the second wellsite to the remote monitoring station.

In one or more aspects of one or more general embodiments, the wellsite data may be wirelessly received at the mobile platform from the plurality of corresponding sensors at or adjacent the wellsite via an 802.11 wireless transmission.

In one or more aspects of one or more general embodiments, a method may further include wirelessly transmitting, in real-time, at least a portion of the wellsite data and a wellsite job status from the mobile monitoring platform to a mobile user device.

In one or more aspects of one or more general embodiments, a method may further include receiving, in real-time, a wellsite job status value from the mobile monitoring platform at the remote monitoring station; and displaying the wellsite job status value at the remote monitoring station.

In one or more aspects of one or more general embodiments, a method may further include receiving from the mobile monitoring platform, in real-time, the wellsite image of at least a portion of the wellsite captured from a camera at the mobile monitoring platform; and displaying the received image at the remote monitoring station substantially simultaneously to receiving the image from the mobile monitoring platform.

In one or more aspects of one or more general embodiments, a method may further include receiving a command to adjust the camera; transmitting a signal from the remote monitoring station to the mobile monitoring platform based on the command; receiving from the mobile monitoring platform, in real-time, a second wellsite image distinct from the first wellsite image of at least a portion of the wellsite captured from the camera at the mobile monitoring platform; and displaying the received second image at the remote monitoring station substantially simultaneously to receiving the second image from the mobile monitoring platform.

In one or more aspects of one or more general embodiments, a method may further include receiving a value corresponding to the $H_2S$ level at the wellsite at the remote monitoring station; determining, at the remote monitoring station, that the $H_2S$ level at the wellsite exceeds a predetermined level; and providing at least one of a visual and auditory alarm at the remote monitoring station indicative of the $H_2S$ level exceeding the predetermined level.

In one or more aspects of one or more general embodiments, a method may further include storing the plurality of measured wellsite values in a data repository at or communicatively coupled to the remote monitoring station; and graphically displaying the plurality of measured wellsite values corresponding to a predetermined time duration at the remote monitoring station.

In one or more aspects of one or more general embodiments, a method may further include receiving a request at the remote monitoring station from a computing device communicatively coupled to the remote monitoring station for at least one of the plurality of measured wellsite values; and transmitting the requested measured wellsite value to the computing device.

In another general embodiment, a wellsite monitoring system includes a plurality of sensors adapted to be positioned at or adjacent a wellsite and measure wellsite values from the wellsite; and a monitoring platform adapted to be transported between a plurality of wellsite locations. The platform includes a receiver adapted to wirelessly receive the measured wellsite values from the plurality of sensors; and a transmitter adapted to wirelessly transmit the measured wellsite values to a remote computing device in real-time.

In another general embodiment, a wellsite monitoring system includes a transportable chassis; one or more remote wireless sensors; and at least one remote computing system communicatively coupled to the chassis. The chassis includes a trailer including: two or more wheels; a hitch adapted to be coupled to a vehicle; and a platform including at least one enclosure. The chassis further includes an equipment mast supported by the platform and extendable vertically upward from the platform; at least one optical receiver coupled to the equipment mast, the optical receiver adapted to capture a plurality of video images at a first viewpoint and a second viewpoint; a communication module including a wireless modem and an antenna; a geographic positioning module adapted to calculate at least one global location of the chassis; a processor module adapted to communicate with at least one of the optical receivers, the communication module, and the geographic positioning module; a mobile device dock adapted to receive at least one handheld computing device and facilitate data communication between the handheld computing device and the processor; and a power generation module electrically coupled to at least one of the optical receiver, the communication module, the geographic positioning module, the processor module, and the mobile device dock. Each remote wireless sensors is adapted to receive data reflecting at least one wellsite condition and communicate the data to the chassis on a real-time basis. The remote computing system includes a memory comprising a wellsite monitoring module; and one or more processors operable to execute the wellsite monitoring module, the wellsite monitoring module operable when executed to: receive at least one video image from the first viewpoint in real-time; present the video image from the first viewpoint through a graphical user interface; receive a user command to rotate the one or more optical receivers from the first viewpoint to the second viewpoint; rotate the optical receiver from the first viewpoint to the second viewpoint; and receive at least one video image from the second viewpoint.

In one or more aspects of one or more general embodiments, a wellsite monitoring system may further include a power module adapted to provide electrical power to at least one of the receiver and transmitter; and a solar energy module electrically coupled to the power module and adapted to receive solar energy, at least one of the power module and solar energy module adapted to convert solar energy into electrical power.

In one or more aspects of one or more general embodiments, a wellsite monitoring system may further include a camera adapted to capture one or more images of the wellsite; and a processing module comprising at least one memory storage device adapted to store the one or more images, the transmitter adapted to wirelessly transmit the one or more images to the remote computing device in real-time.

In one or more aspects of one or more general embodiments, the measured wellsite values may include at least two of a wireless transmission signal strength measured by the monitoring platform; a monitoring platform power capacity; a hydrogen sulfide ($H_2S$) level; a hoist load weight; a pressure; a fluid rate; a fluid property; and a tong event pressure.

In one or more aspects of one or more general embodiments, the wellsite monitoring module may be further operable to receive the data reflecting at least one wellsite condition; store the data in the memory; and graphically present at least a portion of the data reflecting a predetermined time duration to a user.

In one or more aspects of one or more general embodiments, the wellsite monitoring module may be further operable to receive a command from the user reflecting the predetermined time duration; receive a second command from the user reflecting an adjusted predetermined time duration; and graphically present the portion of the data reflecting the adjusted predetermined time duration to the user.

Various implementations of a system including a mobile wellsite monitoring platform according to the present disclosure may include one or more of the following features. For example, the system may allow for real-time data and image monitoring of the wellsite at a remote location, such as at a central office of a wellsite servicing company and/or production company, field office of a well service and/or production company, and/or a mobile communication device (e.g., cell phone, mobile email device, or otherwise). As another example, the system may help prevent theft, intentional damage, or looting of a wellsite located in a remote area through one or more surveillance techniques. In addition, the system may allow for a wellsite servicing company to prevent or minimize a costly mistake during the drilling or completion of a well by monitoring one or more wellsite parameters in real-time. The system may also increase the level of safety for the workers at the wellsite. In some instances, the system may allow for wellsite monitoring and surveillance of wells located in even the most remote of areas.

Various implementations of a system including a mobile wellsite monitoring platform according to the present disclosure may also include one or more of the following features. For instance, the platform may be easily transported between wellsites, one or more staging areas, and the remote monitoring station, such as a central office for a wellsite servicing company. The system may also allow for stand-alone operation at a wellsite that includes substantially no provision for electrical power. In some aspects, the system may allow for greater recordkeeping of events or jobs that occur at the wellsite. For example, the system may receive start and end times of particular job or event that occur at the wellsite, thereby allowing a wellsite servicing company, for example, to ensure that particular jobs are carried out within a specified timeframe. The system may also allow for remote visual monitoring of the wellsite and surrounding area, allowing the well operator, land owner, and production company assurance that nothing improper is occurring at the wellsite. Thus, the system may greatly decrease costs associated with poor business decisions, reduced safety incidents, wellsite operation downtime, theft, vandalism, and even inclement weather at a wellsite.

These general and specific aspects may be implemented using a device, system or method, or any combinations of devices, systems, or methods. The details of one or more implementations are set forth in the accompanying drawings and the description below. Other features, objects, and advantages will be apparent from the description and drawings, and from the claims.

DESCRIPTION OF DRAWINGS

FIG. 9 illustrates one example embodiment of a user interface for managing one or more files associated with a remote wellsite in accordance with the present disclosure.

DETAILED DESCRIPTION

One implementation of a mobile wellsite monitor according to the present disclosure may allow for one or more wellsite variables to be monitored and/or measured by wireless communication between one or more sensors monitoring such data at the wellsite and the mobile wellsite monitor. The mobile wellsite monitor may receive such wireless data and store all or a portion of such data while also wirelessly transmitting all or a portion of such data to a remote monitoring station. The mobile wellsite monitor, according to some embodiments of the present disclosure, may also capture one or more wellsite images, as well as receive wellsite job event data (e.g., start and stop times of certain wellsite job events) from one or more wellsite companies, such as a well operator, directional drilling company, and/or a well completion company. Such job event data may also be wirelessly communicated to the remote monitoring station. In some embodiments, the wellsite variable data and/or job event data may be wirelessly communicated from the mobile wellsite monitor to the remote monitoring station in real-time.

In some embodiments, the remote monitoring station may communicate the received wellsite variable data and job event data to one or more clients and/or mobile user devices. In such embodiments, one or more user interfaces may be presented to the clients or users showing all or a portion of the wellsite variable data and job event data for examination and analysis. Further, in some embodiments, such users and/or clients may command or control the mobile wellsite monitor by, for example, specifying one or more images captured by the mobile wellsite monitor.

Figure 1:
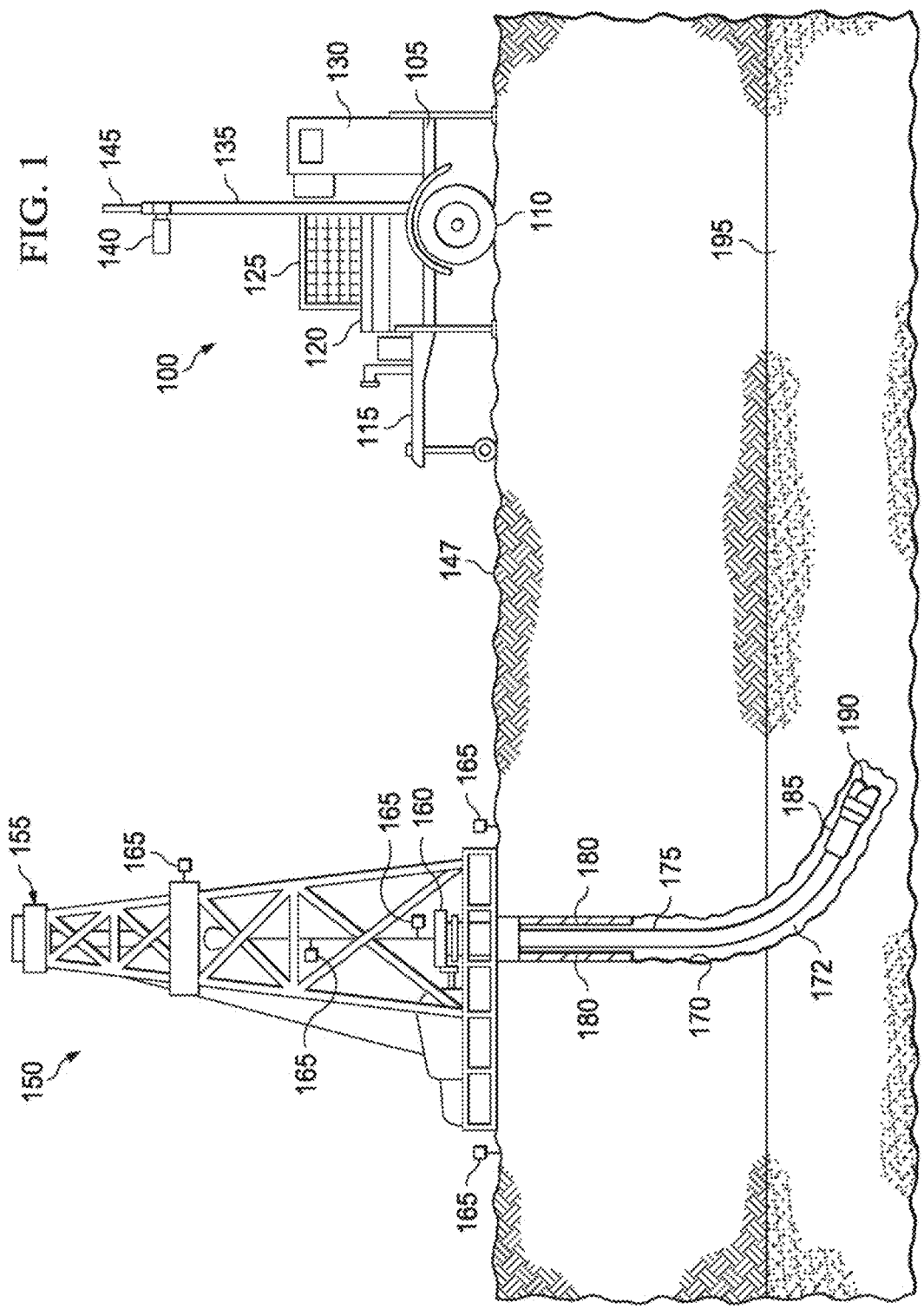
FIG. 1 illustrates one example of a well system at which a mobile wellsite monitoring platform may be located in accordance with the present disclosure.

FIG. 1 illustrates one example of a well system, or wellsite, 150 at which a mobile wellsite monitor 100 may be located. Generally, the mobile wellsite monitor 100 may be transferred to or transported to the wellsite 150 in order to, for example, receive and record data related to one or more wellsite conditions (e.g., wellsite operation data, personnel data, such as personnel on location), provide real-time video of the wellsite 150, and provide such data and video monitoring to a remote monitoring station through wireless communication. The wellsite 150 generally refers to any drilling and/or workover location at which one or more wellbores are created from a surface 147 to a subterranean zone 195, or multiple subterranean zones, for the purpose of producing one or more hydrocarbon fluids (e.g., oil, natural gas, or otherwise) from such subterranean zone 195.

The illustrated wellsite 150 includes a drilling rig 155 located at the terranean surface 147 and supporting a drill string (or pipe) 175. The drill string 175 is generally disposed through a rotary table and into a wellbore 170 that is being drilled through the subterranean zone 195. An annulus 172 is defined between the drill string 175 and the wellbore 170. In some embodiments, at least a portion of the wellbore 170 may be cased. For example, wellsite 150 may include a casing 180 cemented in place within the wellbore 170. The casing 180 (e.g., steel, fiberglass, or other material, as appropriate) may extend through all or a portion of the subterranean zone 195.

Generally, subterranean zone 195 may include a hydrocarbon (e.g., oil, gas) bearing formation, such as shale, sandstone, or coal, to name but a few examples. In some embodiments, the subterranean zone 195 may include a portion or all of one or multiple geological formations beneath the terranean surface 147. For example, the drill string 175 may be disposed through multiple subterranean zones and at multiple angles. Although FIG. 1 illustrates a directional wellbore 170, the present disclosure contemplates and includes a vertically-drilled wellbore and multiple types of directionally-drilled wellbores, such as high angle wellbores, horizontal wellbores, articulated wellbores, or curved wellbores (e.g., a short or long radius wellbore). In short, the wellbore 170 may be a vertical borehole or deviated borehole or may include varying sections of vertical and deviated boreholes.

In some embodiments, the drill string 175 may include a kelly 160 at an upper end, as illustrated in FIG. 1. The drill string 175 may be coupled to the kelly 160, and a bottom hole assembly ("BHA") 185 may be coupled to a downhole end of the drill string 175. The BHA 185 typically includes one or more drill collars, a downhole measurement tool (e.g., MWD or LWD), and a drill bit 190 for penetrating through earth formations to create the wellbore 170. In one embodiment, the kelly 160, the drill pipe and the BHA 185 may be rotated by the rotary table. Alternatively, rotation may be imparted to one or more of the components of the wellsite 150 by a top direct drive system.

FIG. 1 shows one configuration including the BHA 185, which may be rotated by a downhole motor driven by, for example, electrical power or a flow of drilling fluid. In some embodiments, the BHA 185 may include the downhole mud motor used to provide rotational power to the BHA 185. Drill collars may be used to add weight on the drill bit 190 and to stiffen the BHA 185, thereby allowing the BHA 185 to transmit weight to the drill bit 190 without buckling or experiencing a structural failure. The weight applied through the drill collars to the bit 190 may allow the drill bit 190 to cut material in the subterranean zone 195, thereby creating the wellbore 170 in the zone 195.

As the drill bit 190 operates, drilling fluid or "mud" is pumped from the terranean surface 147 through a conduit coupled to a mud pump to the kelly 160. The drilling fluid is then transmitted into the drill string 175, through the BHA 185 and eventually to the drill bit 190. The drilling fluid is discharged from the drill bit 190 and, typically, cools and lubricates the drill bit 190 and transports at least a portion of rock or earth cuttings made by the bit 190 to the terranean surface 147 via the annulus 172. The drilling fluid is then often filtered and reused by pumping it back through the drill string 175.

Although FIG. 1 illustrates one particular location and/or operation (i.e., a drilling operation) in which the mobile wellsite monitor 100 may be utilized, the present disclosure contemplates that the mobile wellsite monitor 100 may be utilized at many other wellsite locations and/or operations. For example, the present disclosure contemplates that the monitor 100 may be utilized at a wellsite during completion, workover, production and/or secondary production operations, as well as servicing, well enhancement, TA/PA operations, and other wellsite operations like rigless wellsite work and general wellsite security surveillance.

The mobile wellsite monitor 100 may be transported to and located near or adjacent to wellsite 150. For example, in some embodiments, the mobile wellsite monitor 100 may be located so as to allow substantially unfettered visual access to the wellsite 150 while remaining apart from activities ongoing at the wellsite 150. As illustrated, the mobile wellsite monitor 100 includes a chassis 105, one or more wheels 110, a hitch assembly 115, a power module 120, a solar panel assembly 125, a control module 130, and a mast 135. Alternatively, other embodiments of the mobile wellsite monitor 100 may include less or additional components as necessary.

Generally, the chassis 105, one or more wheels 110, and the hitch assembly 115 provide for a mobile base or platform for the monitor 100 to operate from and be transported between one or more wellsites or other locations. In the illustrated embodiment, the hinge assembly 115 allows for the mobile wellsite monitor 100 to be coupled to any number of motor vehicles, including trucks, cars, all-terrain vehicles, and construction equipment. Further, although the illustrated mobile wellsite monitor 100 includes two wheels 110, with additional wheels may be added to the chassis 105 for stability or to increase the weight bearing capacity of the chassis 105.

The illustrated power module 120 provides all or a portion of the electrical power requirements of the mobile wellsite monitor 100. For example, the power module 120 may supply electrical power to the control module 130, the mast 135, and any other additional components requiring electrical power. As explained in more detail with reference to FIGS. 3A-3B, the power module 120 may include or be electrically coupled with one or more batteries in order to provide such electrical power.

In addition, the power module 120 may be electrically coupled to the solar panel assembly 125. The solar panel assembly 125, in the illustrated embodiment, receives solar energy into one or more photovoltaic cells. In other words, the solar panel assembly 125 may include a collection of photovoltaic modules that receive light energy from the sun by way of photons to generate electricity through the photovoltaic effect. In some embodiments, the photovoltaic modules of the solar panel assembly 125 may use wafer-based crystalline silicon cells or a thin-film cell based on cadmium telluride or silicon. Alternatively, the solar panel assembly 125 may utilize any appropriate apparatus and techniques for gathering light energy to convert to electrical power.

The control module 130, as illustrated, may provide a processor-based control of the operation of the mobile wellsite monitor 100. For example, the control module 130 may control the operation of the power module 120, as well as one or more components fitted to or integrated with the mast 135. The control module 130, explained in more detail with reference to FIGS. 3A-3B, may generally include one or more processors, one or more memory modules, and one or more communication apparatus, such as a modem and wireless transceiver. The control module 130, however, may include any additional components not shown in the illustrated embodiments of the present disclosure as necessary for operation of the mobile wellsite monitor 100. In addition, the control module 130 may not include certain components of the illustrated embodiments of the mobile wellsite monitor 100 without departing from the scope of this disclosure.

The mast 135, as illustrated, provides for an adjustable vertical beam to which one or more surveillance and/or monitoring components may be attached or fitted. For example, in the illustrated embodiment, the mast 135 (shown in a vertical position) includes one or more cameras 140 and one or more antennas 145. In some embodiments, the mast 135 may be a telescoping mast, such that the length of the mast may be adjustable by one or more tubular sections. Further, in some embodiments, the mast 135 may be rotatable through approximately 90° of rotation. Thus, the mast 135 may be rotated to a substantially horizontal position, such as, for example, when the mobile wellsite monitor 100 is being transported between well sites or other locations. In addition, the mast 135 may be raised to a substantially vertical position (as illustrated in FIG. 1) during surveillance and monitoring operations at the wellsite 150. Alternatively, the mast 135 may be fixed or adjusted to any number of positions in order to, for example, obtain the best viewable image of the wellsite 150 or best or better signal strength for the one or more antennas 145.

As noted, one or more cameras 140 may be a fixed to the mast 135 along its length. In some embodiments, the camera 140 may capture both still and video images of the wellsite 150 or any other appropriate image. Alternatively, the camera 140 may, in some embodiments, only capture still images. In further embodiments, the camera 140 may be an infrared camera operable for both daytime and nighttime operation. In the illustrated embodiment, the camera 140 may include an infrared range up to approximately 300 feet from the camera and also include a wiper function, as well as 360° panoramic capability and 180° tilt capability. The one or more cameras 140, as illustrated, are communicatively coupled to the control module 130 such that one or more images captured by the camera 140 may be transmitted to the control module 130 for further processing and/or transmission to another location.

The one or more antennas 145, as illustrated, are located at a topmost portion of the mast 135. In some embodiments, there may be multiple antennas 145, with each serving a different function. For instance, one antenna 145 may allow for wireless cellular communication to one or more remote locations, such as a remote monitoring station at a wellsite service central office, or one or more handheld devices. An additional antenna 145 may allow the mobile wellsite monitor 100 to receive wireless signals, including data, from one or more sensors at the wellsite 150. As illustrated, the wellsite 150 includes one or more wireless sensors 165 located at various locations in the wellsite 150. The wireless sensors 165 may measure or monitor a number of variables at the wellsite 150. For example, the wireless sensors 165 may measure one or more environmental variables, such as air temperature, wind velocity, wind direction, relative humidity, or barometric pressure. The wireless sensors 165 may also measure one or more variables specific to the drilling, wellsite service, and/or rigless wellsite operation. Such variables may include a concentration of hydrogen sulfide ($H_2S$) in parts per million in the environment surrounding the wellsite 150, as well as one or more forces on hydraulic equipment operating at the rig 155. For instance, the wireless sensors 165 may be pressure sensors that measure forces on equipment such as power tongs or derrick pressure pads. The wireless sensors 165 may also measure a hook load at the rig 155, to ensure that the rig 155 can support the drill string 175 and other downhole apparatus.

Figure 2A:
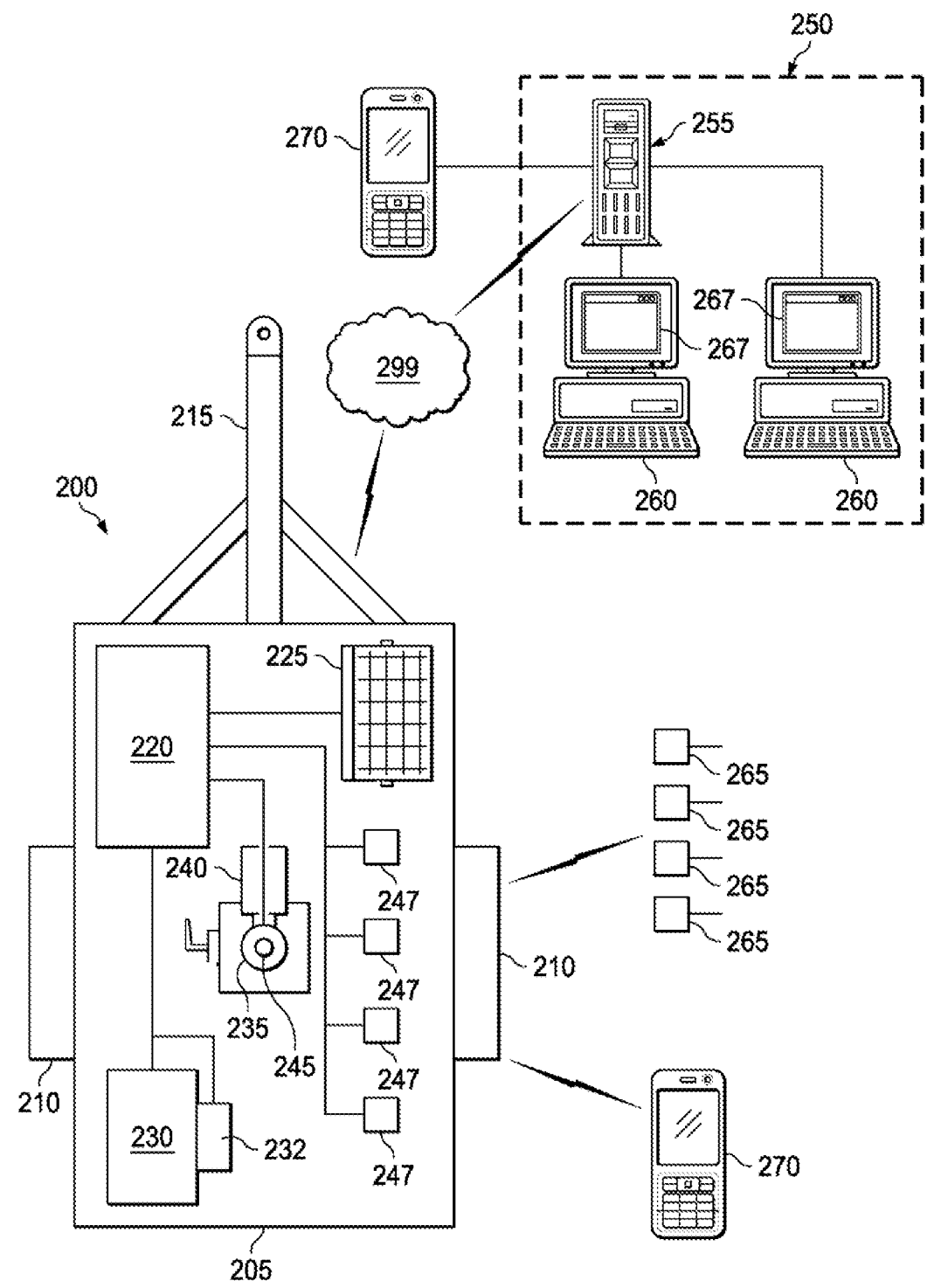
FIG. 2A illustrates a schematic view of one example embodiment of a wellsite monitoring system, including a mobile wellsite monitoring platform and a remote monitoring station in accordance with the present disclosure.

FIG. 2A illustrates a schematic view of one example embodiment of a wellsite monitoring system, including a mobile wellsite monitor 200 and a remote monitoring station 250. In some embodiments, the mobile wellsite monitor 200 may be substantially similar to the mobile wellsite monitor 100 shown in FIG. 1. For example, the mobile wellsite monitor 200 includes a chassis 205, one or more wheels 210, a hitch assembly 215, a power module 220, a solar panel assembly 225, a control module 230, a mast 235, one or more cameras 240, and one or more antennas 245. Such components may be identical to or substantially similar to corresponding components shown in FIG. 1. As illustrated, the power module 220 is electrically coupled to the solar panel assembly 225, the control module 230, and various other components of the monitor 200, such as, for example, one or more platform sensors 247 and one or more components of the mast 235.

The mobile wellsite monitor 200 may also include a communication module 232. The communication module 232, as illustrated, is attached or coupled to the control module 230. Alternatively, the communications module 232 may be integral with the control module 230 or as a stand-alone component on the mobile wellsite monitor 200. In the illustrated embodiment, the communication module 232 may allow for two-way audio communication between a user at the mobile wellsite monitor 200 and another person located remotely from the mobile wellsite monitor 200. For example, the communication module 232 may be a cellular phone cradle, whereby a wireless communication device (e.g., cell phone, personal e-mail device, smart phone, or otherwise) may be charged and stored. Alternatively, the communications module 232 maybe any other appropriate device, such as a satellite phone, CB radio, or two-way walkie-talkie, which would allow audio communication to and from the mobile wellsite monitor 200.

In some embodiments, the communication module 232 may be a mobile user device that can receive specific wellsite event or job data. For instance, in some embodiments, the communication module 232 may be used to receive scanned information specific to a certain job or event occurring at the wellsite 150. For instance, a vendor or third-party wellsite servicer may use the communication module 232 to scan one or more barcodes representative of a specific wellsite event. Although there are many different types of wellsite events and jobs, one example may be a fracturing, or "frac," job. The third-party wellsite servicer hired to complete the frac job may arrive at the wellsite 150 and utilize the communication module 232 to scan in a specific barcode representative of the frac job. This data may be stored so as to keep track of when the third-party company arrived at the wellsite 150 and started the job for which it was hired to do. When the track job is completed, the third-party may utilize the communication module 232 to scan in another barcode representative of the frac job completion. Thus, data may be stored at the mobile wellsite monitor 200 which enables the well operator, wellsite service company, or any other appropriate user to keep track of how long the frac job to do. Although this illustrated example utilized a frac job, the communication module 232 may be used to keep track of many different wellsite job events in addition to a frac job.

The platform sensors 247, as illustrated, may be attached to or securable to the mobile wellsite monitor 200 and provide for measurement or monitoring of any number of wellsite variables (e.g., pressures, flow rates, and/or other variables). For example, the platform sensors 247 may measure one or more environmental variables, such as air temperature, wind speed, wind direction, relative humidity, barometric pressure, or other appropriate variable. The platform sensors 247 may also measure well site data such as $H_2S$ concentration at the wellsite 150. In some embodiments, the platform sensors 247 may be hardwired to one or more components of the mobile wellsite monitor 200, such as the control module 230. Alternatively, the platform sensors 247 may be wireless sensors and operable to be located either on or adjacent to or near the mobile wellsite monitor 200 but still a communicatively coupled to, for example, the control module 230.

As illustrated in FIG. 2A, the mobile wellsite monitor 200 is in wireless communication with one or more wireless sensors 265. The wireless sensors 265 may be identical to or substantially similar to the wireless sensors 165 shown in FIG. 1. In other words, the wireless sensors 265 may be located on or adjacent the rig 155 and measure any number of wellsite variables, such as hydrogen sulfide concentration one or more distinct forces or loads on the hydraulic drilling equipment. In the illustrated embodiment, the mobile wellsite monitor 200 may be in wireless communication with the wireless sensors 265 through a Wi-Fi connection. Alternatively, any appropriate wireless communication protocol may be utilized. For example, the wireless communication protocol may be 802.11a, 802.11b, 802.11g, 802.11n, 802.20, WiMax, and many others. In the illustrated embodiment, the wireless sensors 265 may communicate via the wireless communication protocol to the antenna 245 located at a topmost portion of the mast 235. The data transmitted between the wireless sensors 265 and the mast 235 (e.g., $H_2S$ concentration, tong pressure, well pressures, flow/pump rates) may be communicated to the control module 230 as well. Such data may also be stored in the control module 230 prior to transmitting such data to one or more remote locations.

In some aspects, the mobile wellsite monitor 200 may communicate data via a Wi-Fi connection to one or more additional locations at the wellsite, such as, for example, a wellsite trailer (e.g., logging truck or otherwise), a completion vehicle (e.g., fracing truck, cementing truck, or otherwise), or other well service vehicle. For instance, in some aspects, such as when the communication capability of the mobile wellsite monitor 200 is impaired, it may transmit such wellsite data to one or more of these locations in order for the data to be further transmitted to another location. In addition, depending on the location of one or more remote monitoring sites, Wi-Fi may be exclusively used to transmit data rather than, for instance, cellular or satellite communications.

Continuing with FIG. 2A, the illustrated embodiment of the mobile wellsite monitor 200 wirelessly communicates data to a remote monitoring station 250 through a network 299. Network 299 facilitates wireless communication between the mobile wellsite monitor 200 and any other local or remote computer, such as a remote server 255 located at or communicatively coupled with the remote monitoring station 250. Network 299 may be all or a portion of an enterprise or secured network. In another example, network 299 may be a VPN merely between the mobile wellsite monitor 200 and the remote monitoring station 250 across a wireless link. While illustrated as a single or continuous network, network 299 may be logically divided into various sub-nets or virtual networks without departing from the scope of this disclosure, so long as at least portion of network 299 may facilitate communications between the mobile wellsite monitor 200 and the remote monitoring station 250. Network 299 may communicate, for example, Internet Protocol (IP) packets, Frame Relay frames, Asynchronous Transfer Mode (ATM) cells, voice, video, data, and other suitable information between network addresses. Network 299 may include one or more local area networks (LANs), radio access networks (RANs), metropolitan area networks (MANs), wide area networks (WANs), all or a portion of the global computer network known as the Internet, and/or any other communication system or systems at one or more locations.

Figure 2B:
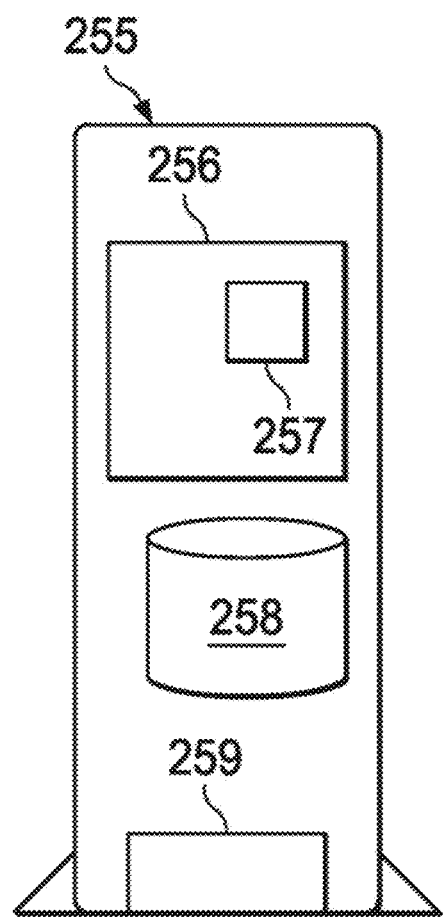
FIG. 2B illustrates a block diagram of a server that may be located at a remote monitoring station in accordance with the present disclosure.

Turning briefly to FIG. 2B, one example embodiment of the server 255 is illustrated. The illustrated server 255 includes a processor 256, which executes a wellsite monitoring module 257, a memory 258, and a network interface 259. Processor 256 executes instructions and manipulates data to perform the operations of server 255. Processor 256 is, for example, a central processing unit (CPU), a blade, an application specific integrated circuit (ASIC), or a field-programmable gate array (FPGA). Although FIG. 2B illustrates a single processor 256 in server 255, multiple processors 256 may be used according to particular needs and reference to processor 256 is meant to include multiple processors 256 where applicable. In the illustrated embodiment, processor 256 executes the wellsite monitoring module 257.

At a high-level, the wellsite monitoring module 257 is a software module that receives, generates, transforms, transmits, and/or stores data related to, for example, the wellsite 150, the mobile wellsite monitor 200, and the remote monitoring station 250. More specifically, the wellsite monitoring module 257 is any application, program, module, process, or other software that receives data from the mobile wellsite monitor 200 indicating variables measured by one or more of the wireless sensors 265 and/or the sensors 247, as well as other components of the monitor 200; transforms such data and presents all or a portion of such data to one or more users, such as one or more clients 260 and/or 270; and receives commands or instructions from such users (e.g., clients 260) in order to control and/or manipulate one or more components of the mobile wellsite monitor 200. Regardless of the particular implementation, "software" may include software, firmware, wired or programmed hardware, or any combination thereof as appropriate. Indeed, wellsite monitoring module 257 may be written or described in any appropriate computer language including C, C++, Java, Visual Basic, assembler, Perl, any suitable version of 4GL, as well as others. For example, wellsite monitoring module 257 may be a composite application, portions of which may be implemented as Enterprise Java Beans (EJBs) or the design-time components may have the ability to generate run-time implementations into different platforms, such as J2EE (Java 2 Platform, Enterprise Edition), ABAP (Advanced Business Application Programming) objects, or Microsoft's .NET. It will be understood that while wellsite monitoring module 257 is illustrated in FIG. 2B as a single module, wellsite monitoring module 257 may include numerous other sub-modules or may instead be a single multi-tasked module that implements the various features and functionality through various objects, methods, or other processes. Further, while illustrated as internal to server 255, one or more processes associated with wellsite monitoring module 257 may be stored, referenced, or executed remotely. For example, a portion of wellsite monitoring module 257 may be a web service that is remotely called, while another portion of wellsite monitoring module 257 may be an interface object bundled for processing at, for example, one or more clients 260. Moreover, wellsite monitoring module 257 may be a child or sub-module of another software module or enterprise application (not illustrated) without departing from the scope of this disclosure.

Memory 258, generally, stores data received from the mobile wellsite monitor 200 at the remote monitoring station 250, requests or instructions received from one or more users, such as clients 260, as well as historical data associated with the wellsite 150, among other data. In any event, however, memory 258 may store any appropriate information associated with the wellsite 150, the mobile wellsite monitor 200, and/or the remote monitoring station 250. Memory 258 may, in some embodiments, include any memory or database module and may take the form of volatile or non-volatile memory including, without limitation, magnetic media, optical media, random access memory (RAM), read-only memory (ROM), removable media, or any other suitable local or remote memory component. Memory 258 may also include, along with the aforementioned wellsite—related data, any other appropriate data such as VPN applications or services, firewall policies, a security or access log, print or other reporting files, HTML files or templates, data classes or object interfaces, child software applications or sub-systems, and others. Although illustrated as a single memory 258, reference to memory 258 includes reference to any number of memories or portions of memories, as appropriate.

The server 255 communicates with the network 299, one or more clients 260, and one or more mobile user devices 270 via a network interface 259. In certain embodiments, server 255 receives data from internal or external senders through interface 259 for storage in memory 258 and/or processing by processor 256. Generally, interface 259 comprises logic encoded in software and/or hardware in a suitable combination and operable to communicate with network 299. More specifically, interface 259 may comprise software supporting one or more communications protocols associated with communications network 299 or hardware operable to communicate physical signals.

Returning now to FIG. 2A, the remote monitoring station 250 includes one or more clients 260 including corresponding graphical user interfaces (GUI) 267. As illustrated, the clients 260 may be used for real-time monitoring of variables and data associated with the wellsite 150 and/or the mobile wellsite monitor 200, which are received through the network 299 from the mobile wellsite monitor 200. Clients 260 may also present one or more graphical displays representing such data and variables to a user through the GUIs 267. Although illustrated as having two clients 260, the remote monitoring station 250 may have fewer or more clients 260 as appropriate. For example, the number of clients 260 communicatively we coupled to the server 255 at the remote monitoring station 250 may be dependent on the number of mobile wellsite monitors 200 located at wellsites 150.

Client 260 is any computing device operable to connect or communicate with server 255 or network 299 using any communication link. At a high level, each client 260 includes or executes at least GUI 267 and comprises an electronic computing device operable to receive, transmit, process, and store any appropriate data associated with the wellsite 150, the mobile wellsite monitor 200, and/or the remote monitoring station 250. Client 260 typically includes local memory or may be coupled with some relatively remote or distributed memory that may be quickly accessed. Further, "client," "business," and "user" may be used interchangeably as appropriate without departing from the scope of this disclosure. Moreover, for ease of illustration, each client 260 is described in terms of being used by one user. But this disclosure contemplates that many users may use one computer or that one user may use multiple computers. In certain situations, users may include one or more developers.

For simplicity, each client 260 may encompass a personal computer, touch screen terminal, workstation, network computer, kiosk, wireless data port, smart phone, personal data assistant (PDA), one or more processors within these or other devices, or any other suitable processing device used by or for the benefit of client 260. In the illustrated embodiment, clients 260 encompass a personal computer, touch screen terminal, workstation, or network computer, while client 270 encompasses a mobile user device, such as a smart phone, personal data assistant, mobile e-mail device, or cell phone. In another example, clients 260 (or 270) may comprise a laptop that includes an input device, such as a keypad, touch screen, mouse, or other device that can accept information, and an output device that conveys information associated with the operation of server 255 or clients 260, including digital data, visual information, or GUI 267. Both the input device and output device may include fixed or removable storage media such as a magnetic computer disk, CD-ROM, or other suitable media to both receive input from and provide output to users of clients 260 through the display, namely, the client portion of GUI or application interface 267.

Figure 3A:
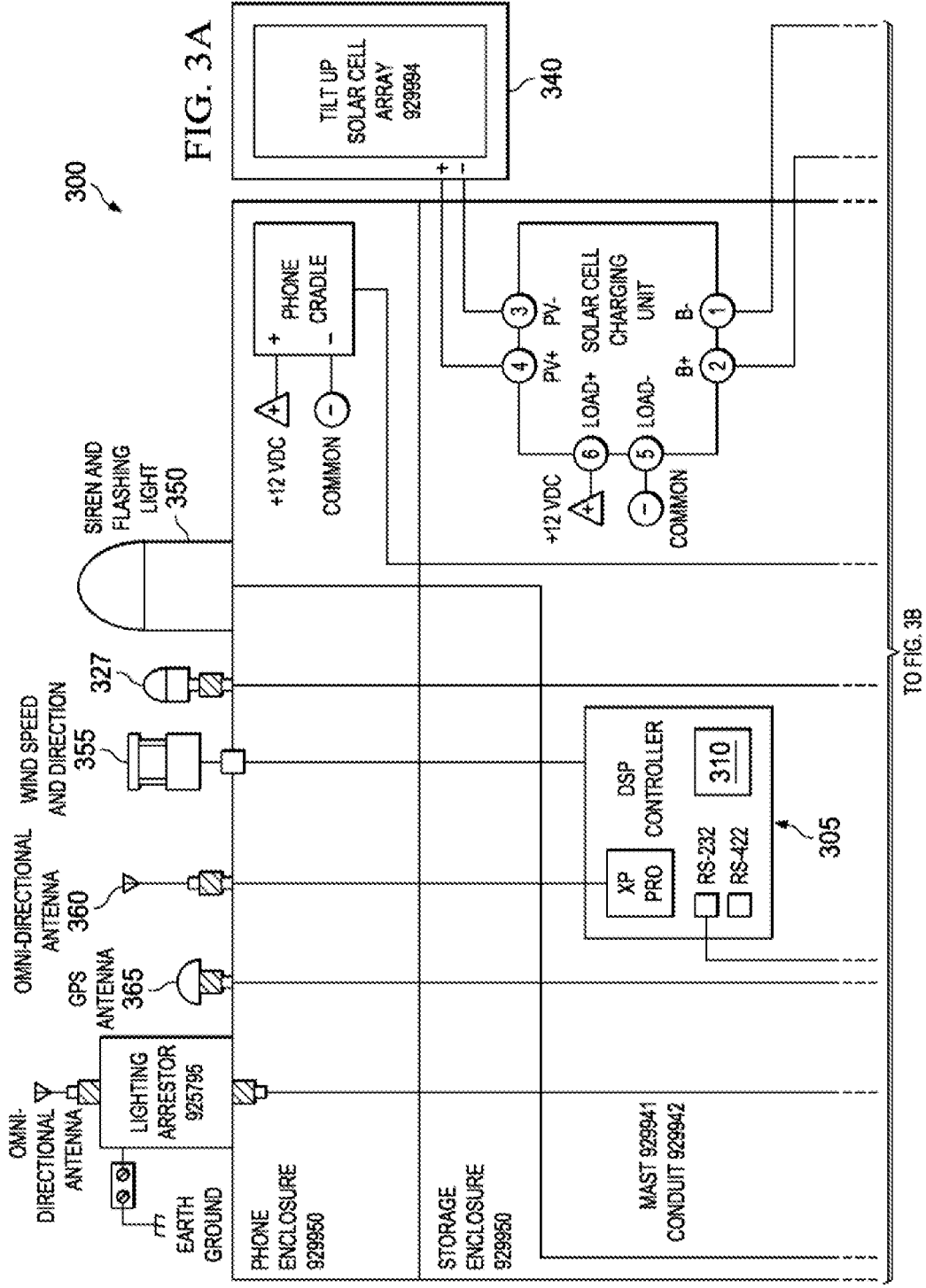
FIGS. 3A-3B illustrate a schematic view of one example embodiment of a mobile wellsite monitoring platform in accordance with the present disclosure.
Figure 3B:
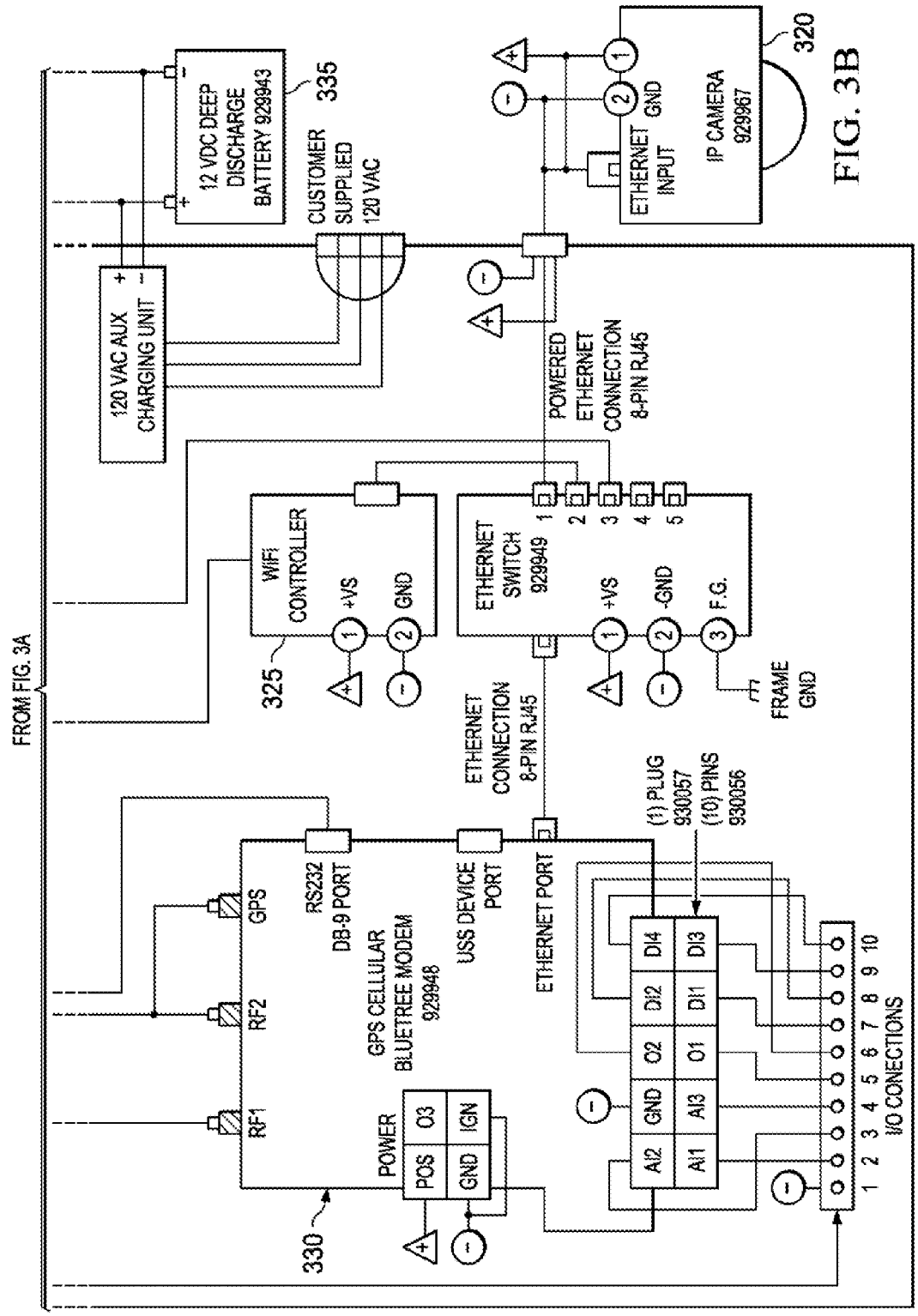

FIGS. 3A-B illustrate a schematic view of another example embodiment of a mobile wellsite monitor 300. In some embodiments, the mobile wellsite monitor 300 shown schematically in 3A-3B may be the same or substantially similar to one or both of the mobile wellsite monitors 100 and/or 200 shown in FIGS. 1 and 2A-2B, respectively. Although specific components are shown in the schematic or view of the mobile wellsite monitor 300, other analogous components may be substituted while still accomplishing the same or substantially similar functionality, without departing from the scope of the present disclosure. As illustrated, the mobile wellsite monitor 300 includes a digital signal processor (DSP) controller 305, which may include a memory module 310; a camera 320; a wireless controller 325 coupled to a wireless antenna 327; a cellular modem 330; a battery 335; a solar panel array 340; a phone cradle; an audio/visual alarm 350; a wind sensor 355; an antenna 360; and a global positioning satellite (GPS) antenna 365. Generally, similarly named components of one or both of the mobile wellsite monitors 100 and 200, included in the mobile wellsite monitor 300 have the same or substantially similar functionality.

For example, in some embodiments, the mobile wellsite monitor 300 may receive power from up to three sources. For instance, the monitor 300 may receive power via a 120 VAC (or other voltage value) connection; the battery 335; and/or the solar panel array 340. As illustrated, if power is received from the solar panel array 340, power may be delivered to the other components of the mobile wellsite monitor 300 through connections 3 and 4 at a solar cell charging unit. If power is utilized from either of the 120 VAC connection or the battery 335, such power is provided to the other components at the connections 1 and 2 of the solar cell charging unit. In some embodiments, the battery 335 may be recharged, such as from the 120 VAC connection and/or another power source, such as a generator, wind turbine, or otherwise.

As illustrated, the mobile wellsite monitor 300 includes an audio/visual alarm 350. The alarm 350 may be utilized, for example, to warn and/or inform wellsite personnel that one or more wellsite variables may be at or exceeding a threshold value. For instance, the alarm 350 may be used if an $H_2S$ concentration monitored by the mobile wellsite monitor 300 exceeds a maximum value. As another example, the alarm 350 may be initiated if the wind sensor 355 indicates high velocity and/or dangerous wind speeds. In some embodiments, the wind sensor 355 may be one or more of the wireless sensors 165 and/or the environmental sensors 247.

In some embodiments, the cellular modem 330 may be used to transmit wellsite data from a mobile wellsite monitor 300 to a remote monitoring station, such as the remote monitoring station 250. Alternatively, the mobile wellsite monitor 300 may employee other techniques for wireless communication to the remote monitoring station. For instance, the mobile wellsite monitor 300 may employee satellite transmissions to send wellsite data to the remote monitoring station.

The wireless controller 325, as illustrated, receives one or more wireless data signals via the wireless antenna 327 from one or more wireless sensors located at or near the wellsite 150 and/or wellbore 170. For example, the wireless controller 325 may receive data from the wireless sensors 165 and environmental sensors 247. In some embodiments, for example, a wireless $H_2S$ sensor may be located at or adjacent the wellbore 170 in order to measure $H_2S$ concentration of the wellsite 150.

The controller 305, typically, controls the operations of the mobile wellsite monitor 300. Alternatively, in some embodiments, other controllers and/or processors may control all or a portion of the mobile wellsite monitor 300. As illustrated, the controller 305 includes memory 310. In some embodiments, the memory 310 may store, for at least more than a transitory period of time, wellsite data received by the wireless controller 325 and/or images captured by the camera 320.

In the illustrative embodiment of FIGS. 3A-3B the mobile wellsite monitor 300 includes GPS capability via the GPS antenna 365. For instance, the mobile wellsite monitor 300 may determine its precise global position, and thus that of the wellsite 150, in order to send such information back to the remote monitoring station. Thus, users at the remote monitoring station may be aware of the exact location of the mobile wellsite monitor 300 at all times. Further, in some embodiments, the mobile wellsite monitor 300 may include one or more alarms (e.g. audio and/or visual or otherwise) that are actuated when the GPS coordinates of the monitor 300 change. For instance, the alarms may be actuated when the GPS coordinates of the monitor 300 change more than a threshold amount (e.g., 100 yards, 1 mile, 10 miles, or other adjustable amount). As another example, in some embodiments, the mobile wellsite monitor 300 may notify the remote monitoring station when such alarms are actuated and/or the GPS coordinates of the monitor 300 change (e.g., change without authorization).

Figure 4:
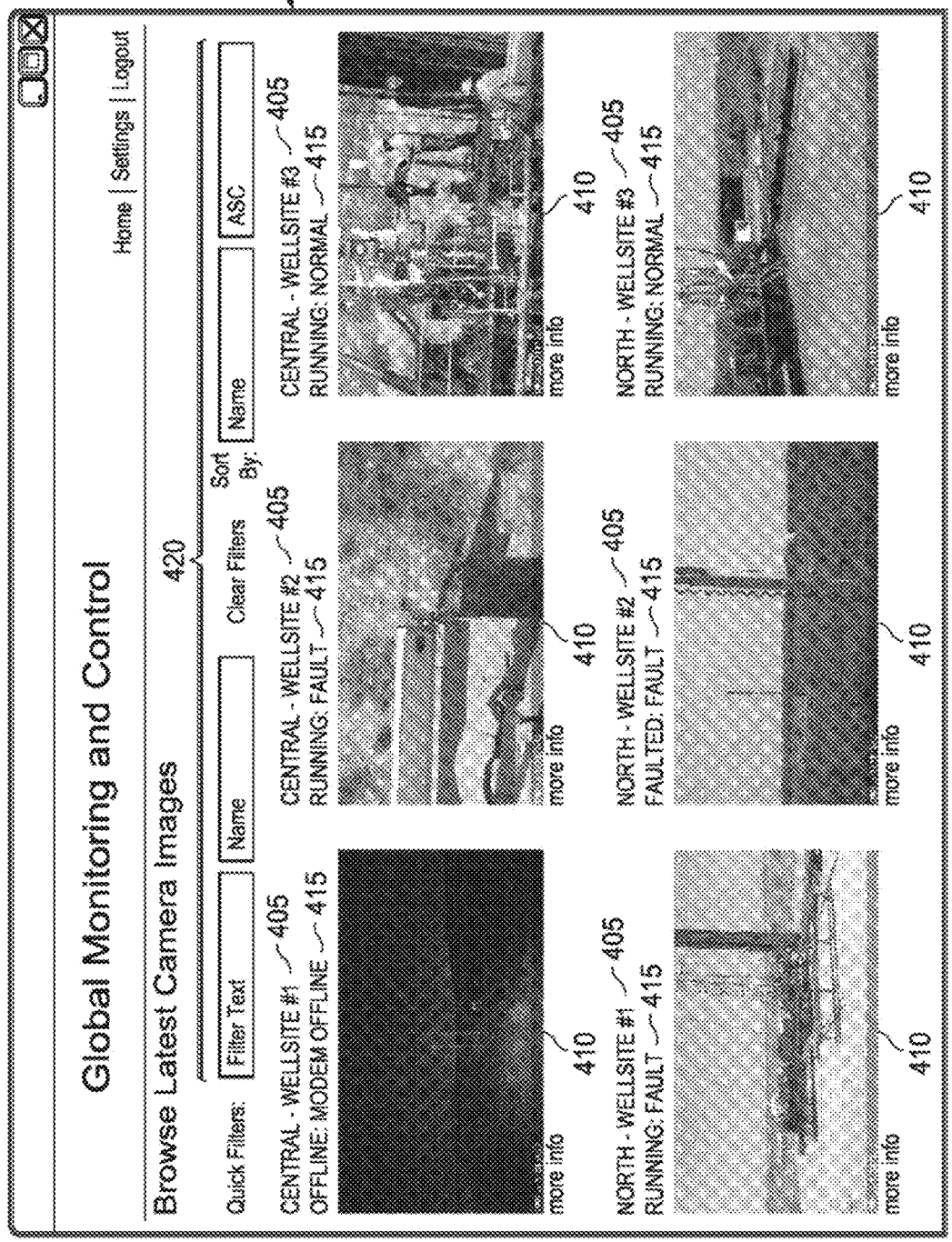
FIG. 4 illustrates one example embodiment of a remote wellsite global monitoring and control user interface in accordance with the present disclosure.

FIG. 4 illustrates one example embodiment of a remote wellsite global monitoring and control user interface 400. In some embodiments, the interface 400 may be presented to one or more users at a remote monitoring station, such as users of one or more clients 260 and/or 270 at the remote monitoring station 250 illustrated in FIG. 2A. As illustrated, the global monitoring and control interface 400 may provide the users with one or more specific pieces of wellsite data for a number of different wellsites. For example, the interface 400 may include wellsite indicators 405, wellsite images 410, wellsite status indicators 415, and one or more filters 420. Typically, the wellsite indicators 405 provide a name of the wellsite used by the wellsite servicing organization, or any organization utilizing and/or controlling the mobile wellsite monitor, that provides such data for the interface 400.

The wellsite images 410 may, in some embodiments, illustrated a current image captured by one or more cameras of the mobile wellsite monitor, such as the cameras 140 and/or 240. Thus, the users at the remote monitoring station may know, in real-time, many variables of the wellsite, such as weather conditions and progress of operations occurring at the wellsite. In some embodiments, the wellsite images 410 on the global monitoring and control interface 400 may automatically update at a predetermined time interval, such as every five minutes.

The status indicators 415 may provide the users at the remote monitoring station or mobile client devices an instant indication regarding the operations at the wellsite. For example, the indicators 415 may inform the users that operations of the wellsite are running normal or have encountered difficulties, such as a fault. In some embodiments, for example, additional indicators may be provided to the users at the remote monitoring station. For instance, one indicator may provide a status indication of cellular reception strength at the location of the mobile wellsite monitor. Such cellular reception strength may, in some aspects, indicate to the user whether the mobile wellsite monitor has sufficient communication capabilities to transmit wellsite data or whether the mobile wellsite monitor should be adjusted (e.g., moved) to another location at the wellsite to improve such reception.

In some embodiments, the users may filter such data presented on the global monitoring and control interface 400 through one or more filters 420. For example, data presented on the interface 400 may be filtered by geographic location, image, status indicators, or any other appropriate variable.

Figure 5A:
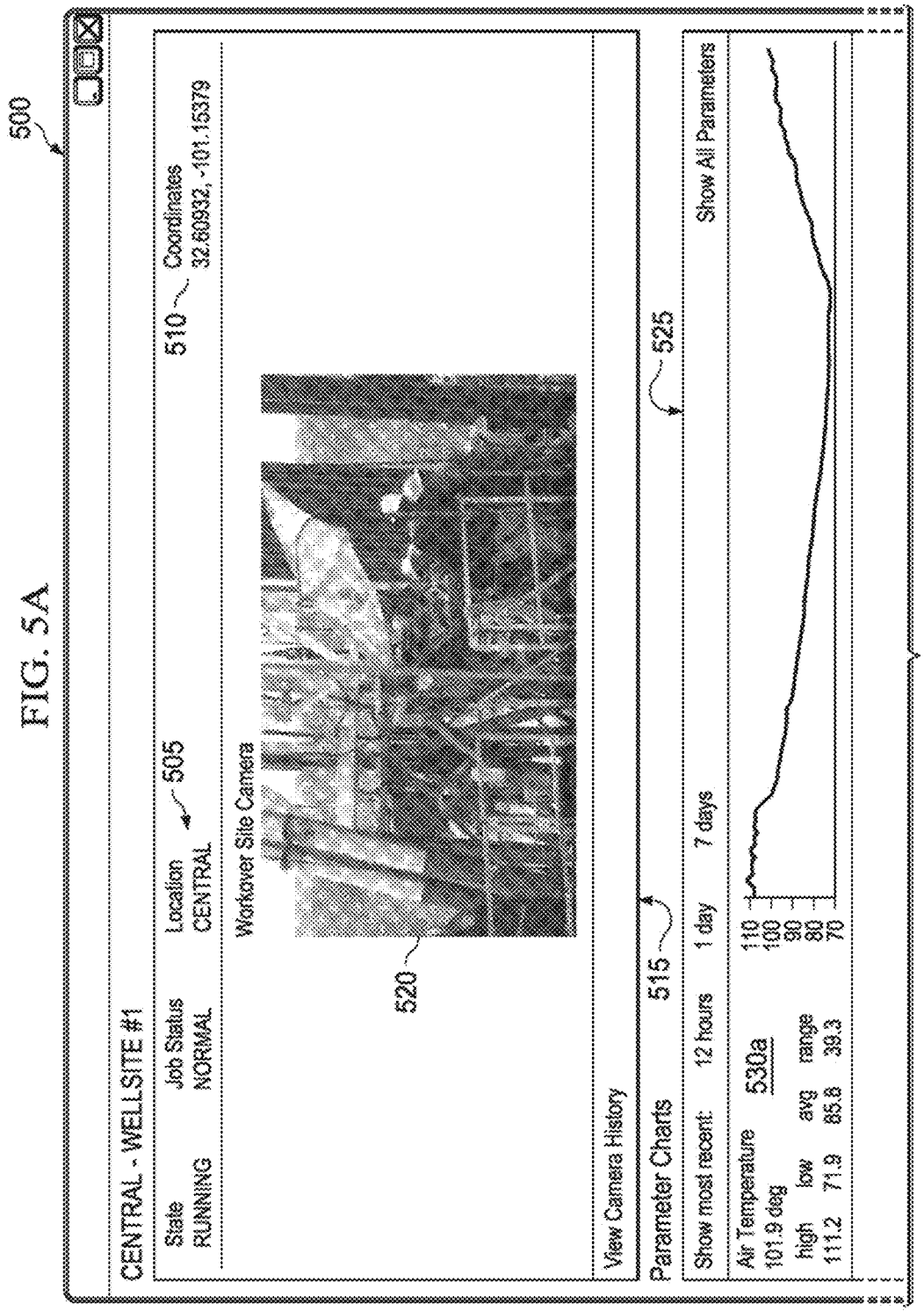
FIGS. 5A-5B illustrate one example embodiment of a user interface for wellsite monitoring and surveillance of a particular wellsite in accordance with the present disclosure.
Figure 5B:
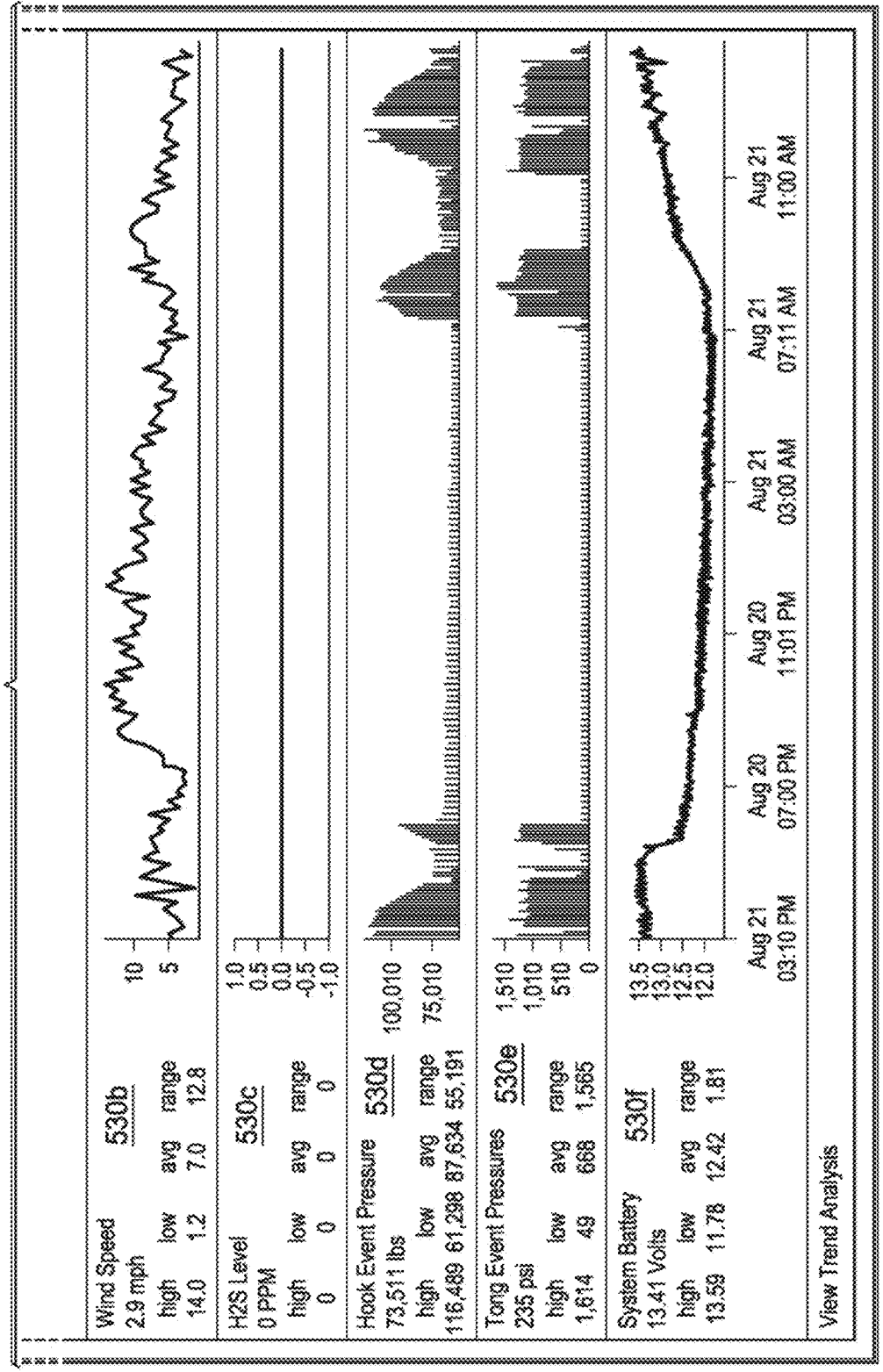

FIGS. 5A-5B illustrate one example embodiment of a wellsite monitoring interface 500. In some embodiments, the wellsite monitoring interface 500 may be a more specific interface for a single wellsite shown on the global monitoring and control user interface 400. For example, a user may select one of the wellsites shown on the global monitoring and control user interface 400 and thereby be presented the wellsite monitoring interface 500 specific to the chosen wellsite. In some embodiments, the wellsite monitoring interface 500 may be presented at one or more clients 260 through corresponding GUIs 267 or may be presented to one or more mobile user devices 270.

The illustrated interface 500 includes a wellsite indicator 505, a wellsite location 510, an image window 515, a wellsite image 520, a wellsite data window 525, and one or more sets of wellsite data 530a-530f. The wellsite indicator 505 provides such information as, for example, the name of the wellsite, at what state the wellsite is operating, a status of one or more jobs, and/or a geographical location of the wellsite.

Alternatively, the wellsite indicator 505 may include more information or less information as needed. The wellsite location 510, in the illustrated embodiment, provides the exact coordinates of the wellsite. For example, a mobile wellsite monitor communicatively coupled to the remote monitoring station at which the wellsite monitoring interface 500 may be presented to a user may include a GPS device and antenna, thereby providing the location of the wellsite for the interface 500.

The wellsite image window 515 typically includes one or more captured images 520 of the wellsite. The wellsite image 520 may be updated according to several techniques. For instance, the wellsite image 520 may be updated at regular time intervals, such as every 1 minute. The wellsite image 520 may also be updated upon a specific user request or command. Alternatively, the wellsite image 520 may be updated only when a new job event occurs at the wellsite, or when a job status at the wellsite changes. In some embodiments, a user command or request for an updated image may provide the user with a new wellsite image 520 in real-time. In other words, upon the request or command, a camera on or at the mobile wellsite monitor may instantly capture an image (e.g. live video and/or still images) and transmit the image to the remote monitoring station for presentation to the user through the interface 500.

The wellsite data window 525 may include one or more wellsite variables displayed discretely or graphically. In some embodiments, such data may be presented both discretely (e.g., high, low, average, range) as well as graphically (e.g., along a Cartesian or Polar coordinate system). In the illustrated embodiment, wellsite data 530a-530f is shown in the wellsite data window 525. For instance, the illustrated embodiment of the interface 500 shows wellsite data 530a as wellsite air temperature in degrees Fahrenheit; wellsite data 530b as wellsite windspeed in miles per hour; wellsite data 530c as $H_2S$ level in parts per million; wellsite data 530d as a hook event pressure in pounds; wellsite data 530e as a tong event pressure in pounds per square inch; and wellsite data 530f as a system battery charge (e.g., battery charge remaining for the mobile wellsite monitor) in volts. Of course, additional wellsite data may be presented as necessary.

As illustrated, the wellsite data 530a-530f is presented as discrete values as well as graphically. Regarding the graphical representation of such data, the interface 500 may allow for the data to be shown over an adjustable time duration. For example, the user may choose any number of time intervals in which to graphically receive the data. As illustrated, such time intervals may include 12 hours, one day, seven days, one month, six months, or other time period. Alternatively, other time intervals may be chosen and utilized by the user.

Figure 6:
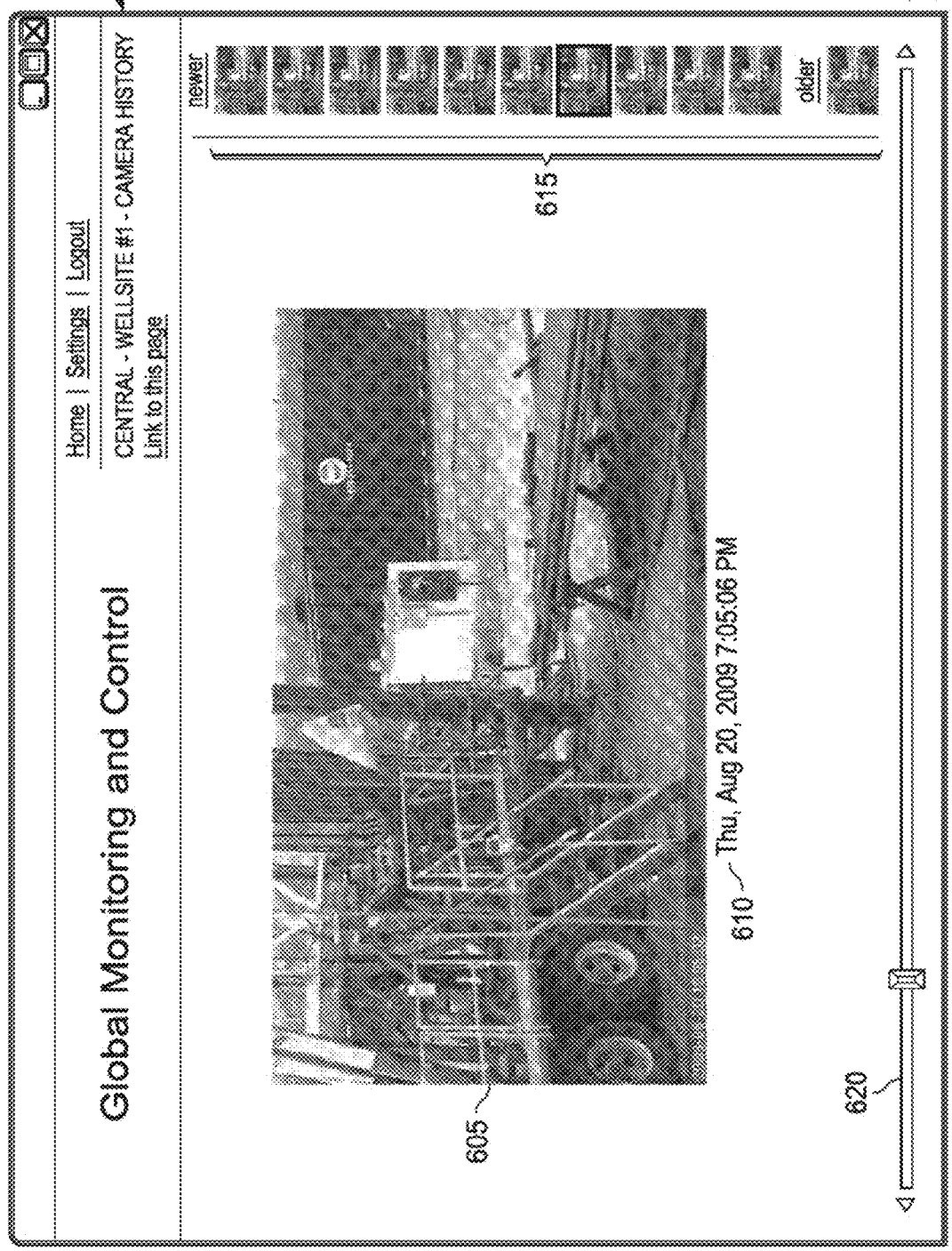
FIG. 6 illustrates one example embodiment of a user interface for historical image monitoring of a remote wellsite in accordance with the present disclosure.

FIG. 6 illustrates one example embodiment of a historical image interface 600. In the illustrated embodiment of the historical image interface 600, the user (e.g., one or more clients 260 and 270) may select and view historical image data of the monitored wellsite. For instance, the historical image interface 600 includes a selected image 605, an image time reference 610, one or more historical images 615, and a time reference slider 620. The selected wellsite image 605 may be any image stored at or by, for example, the mobile wellsite monitor and/or the remote monitoring station. Such images may be presented to the user through interface 600 along a portion of the interface as historical images 615. The historical images 615 may be any stored wellsite image that was captured prior to the selected image 605, contemporaneously to the selected image 605, or subsequent to the selected image 605. In some embodiments, the selected image 605 is highlighted among the historical images 615.

In some embodiments, the images 615 and the selected image 605 may be still images. Alternatively, each of the images 615 (or a portion of the images 615) as well as the selected image 605 may represent a video image or video file.

Some embodiments of the historical image interface 600 may include the time reference slider 620. The time reference slider 620 may allow the user to quickly jump ahead or backwards within a particular time interval to search for captured images. For example, a link of the time interval slider 620 may represent one week of historical images 615. The user may slide the selector of the slider 620 along its length in order to jump to a particular format of the time interval.

Figure 7:
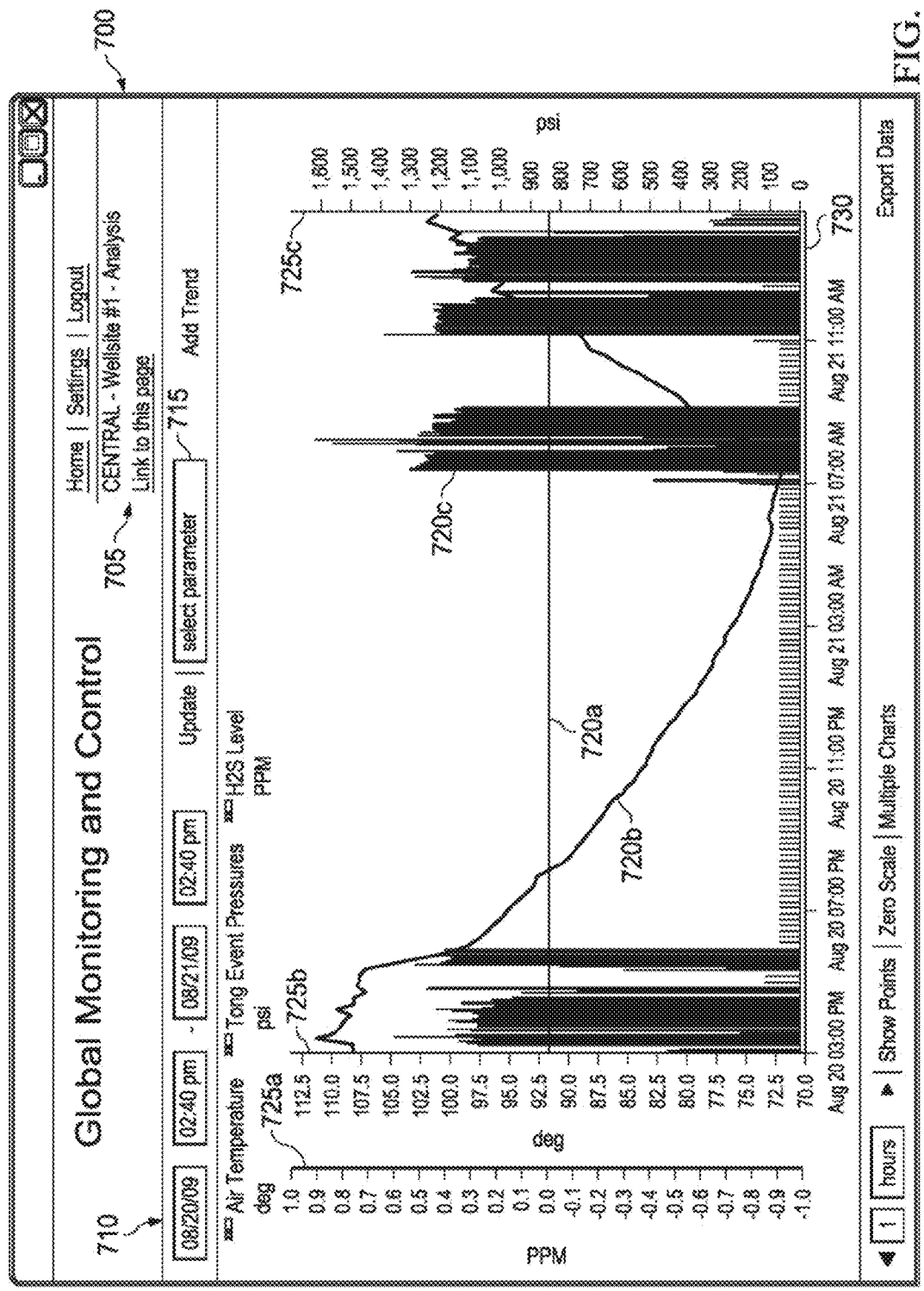
FIG. 7 illustrates one example embodiment of a user interface for monitoring and viewing wellsite data trends in accordance with the present disclosure.

FIG. 7 illustrates one example embodiment of a wellsite trend interface 700. As illustrated, the wellsite trend interface 700 may allow the user to graphically view one or more wellsite data trends for a particular wellsite. The wellsite trend interface 700 includes a wellsite indicator 705, a time reference 710, a trend selector 715, one or more trend lines 720a-720c, one or more corresponding trend axes 725a-725c, and a time axis 730.

The wellsite indicator 705 provides of the name, location, or nickname of the chosen wellsite for which one or more wellsite variable trends are presented. The time reference 710 provides the particular time interval for which the particular trend lines 720a-720c are presented. For example, in the illustrated embodiment, the trend lines 720a-720c are presented over a 24-hour period of time. In some embodiments, the user may adjust the particular time reference 710 for which the trend lines 720a-720c are graphically presented. The user may also choose or manage the trend lines 720a-720c through the trend selector 715. In some embodiments, the user may select the trend lines 720a-720c to be graphically presented through a drop-down selection box.

Each of the trend lines 720a-720c represent any particular wellsite variables measured and/or received by the mobile wellsite monitor and wirelessly transmitted to the remote monitoring station. In the illustrated embodiment of the interface 700, the trend line 720a represents the $H_2S$ level in parts per million. The trend line 720b represents the wellsite air temperature in degrees Fahrenheit. The trend line 720c represents a tong event pressure in pounds per square inch. Alternatively, other wellsite variables (e.g., windspeed, relative humidity, hook event pressure, and system battery) may be graphically presented by a trend line. Each of the trend lines 720a-720c may be shown along a corresponding trend unit axis 725a-725c. Further, each trend line 720a-720c may be presented over the time axis 730, which may, in some embodiments, be common to each of the trend lines 720a-720c.

Figure 8:
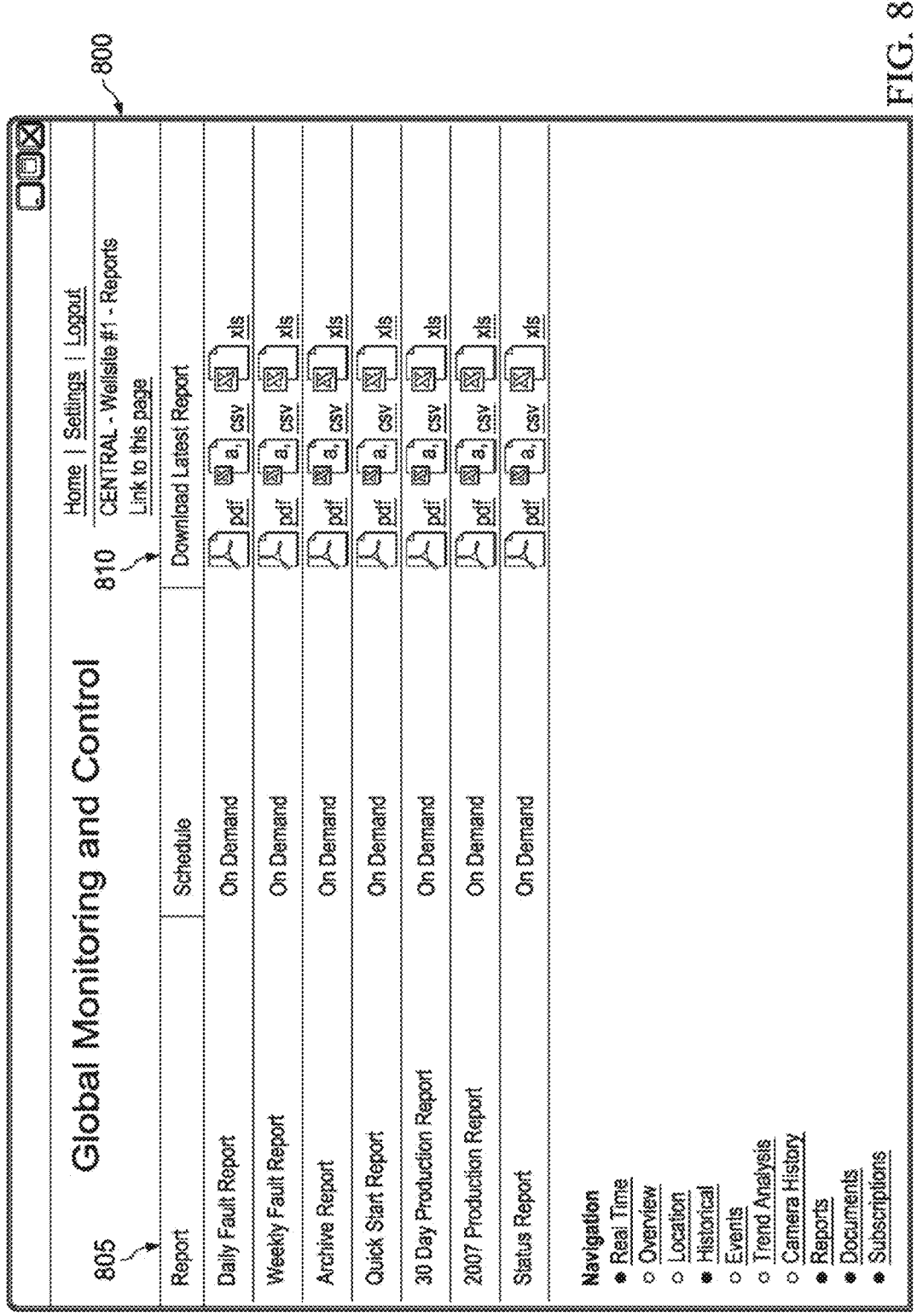
FIG. 8 illustrates one example embodiment of a user interface for managing one or more reports associated with a remote wellsite in accordance with the present disclosure.

FIG. 8 illustrates one example embodiment of a wellsite report interface 800. In the illustrated embodiment, the wellsite report interface 800 may allow a user or client to download, view, e-mail, or otherwise manage one or more images or reports associated with a particular chosen a wellsite. The illustrated wellsite report interface 800 includes, among other features, one or more report types 805 with each report type 805 having a corresponding report library 810. The illustrated report types 805 include a daily fault report, a weekly fault report, an archive report, a quick start report, a 30 day production report, a yearly production report, and a status report. Each report type 805 may be presented (e.g., downloaded, saved, viewed) in one or more file formats as shown in the corresponding report library 810. Such formats include, for example, .pdf, .csv, and .xls. Alternatively, other file formats (e.g., .txt, .doc) may be shown in each corresponding report library 810.

FIG. 9 illustrates one example embodiment of a wellsite file interface 900. As illustrated, the wellsite file interface 900 may allow a user to a manage (e.g., view, download, save, edit, or otherwise) one or more files associated with a wellsite monitored by a mobile wellsite monitor. The illustrated wellsite file interface 900 includes a file name list 905, a file category 910, a file type 915, a file size 920, and a file manager 925.

The file name list 905 includes the file name of all the wellsite files stored at, for example the mobile wellsite monitor and/or the remote monitoring station. In some embodiments, a short description of each file may also be included in the interface 900. For example, for a particular image file, the description may include a short synopsis of the wellsite event shown in the image. The file category 910 provides a short description of the contents of the files listed in the interface 900. The file type 915 provides, in some embodiments, the particular file extension for each file displayed on the interface 900. The file size 920 provides an indication of how large the particular file displayed in the interface 900 may be.

The file manager 925 may allow the user to upload, download, edit, delete, or otherwise manage the files displayed on the wellsite file interface 900. In some embodiments, a user's ability to manage such files may be dependent on the user's priority access to the interface 900. For example, certain users may not be allowed to add or delete the files to the interface 900; such users may only be able to view or sale the files. In other embodiments, each user may have full access to manage the files displayed on the wellsite file interface 900. Further, the file manager 925 may include a security check, such as a password protection feature A number of implementations have been described. Nevertheless, it will be understood that various modifications may be made. For instance, one or more additional user interfaces beyond the illustrated interfaces 400, 500, 600, 700, 800, and 900 may be presented to and viewable by one or more users, such as the clients 260 and 270. In addition, other users or clients not located at a remote monitoring station, such as the remote monitoring station 250, may still view and/or manage each of the illustrated interfaces as well as other user interfaces. For instance, one more users may access the remote monitoring station through a web based application or portal and view such interfaces in a remote location over the world wide web. Accordingly, other implementations are within the scope of the following claims.

What is claimed is:

1. A method for monitoring a wellsite, comprising:
   (i) transporting a mobile monitoring platform to a wellsite, the mobile monitoring platform having a communication module in communication with a control module;
   (ii) providing at least one sensor in communication with said control module, said sensor configured to collect wellsite data;
   (iii) providing a camera in communication with said control module;
   (iv) capturing wellsite data by said sensor;
   (v) capturing a video image of a portion of the wellsite by said camera;
   (vi) receiving at said communication module said wellsite data collected by said sensor;
   (vii) receiving at said communication module said one video image captured from said camera; and
   (viii) transmitting said wellsite data and said video image from said communication module in real-time;
   (ix) wherein said wellsite data and said at least one video image are at least partially communicated through a communication network to a remote monitoring station.

2. The method of claim 1, wherein said video image comprises a first image, the method further comprising:
   receiving, from said remote monitoring station, a command at said mobile monitoring platform to adjust said camera;
   adjusting said camera based on said command;
   capturing a second image distinct from said first image of at least a portion of the wellsite at said mobile monitoring platform with the camera; and
   wirelessly transmitting, in real-time, the second image from said mobile monitoring platform to said remote monitoring station.

3. The method of claim 1, the wellsite comprising a first wellsite, the method further comprising:
   transporting said mobile monitoring platform from said first wellsite to a second wellsite;
   receiving wellsite data from said second wellsite at the mobile platform from a plurality of corresponding sensors at or adjacent said second wellsite; and
   transmitting, in real-time, the wellsite data from said second wellsite;
   wherein the wellsite data is at least partially communicated through said communication network to said remote monitoring station.

4. The method of claim 1, further comprising transmitting, in real-time, at least a portion of the wellsite data and a wellsite job status from said mobile monitoring platform to a mobile user device.

5. The method of claim 1, further comprising:
   receiving a wellsite job status value at said mobile monitoring platform; and
   transmitting, in real-time, said wellsite job status value from said mobile monitoring platform to said remote monitoring station.

6. The method of claim 5, wherein the step of wirelessly receiving a wellsite job status value at said mobile monitoring platform comprises:
   receiving a wellsite job status at a mobile user device that is in operative communication with said mobile monitoring platform; and
   wirelessly communicating said received wellsite job status from said mobile user device to said mobile monitoring platform.

7. The method of claim 5, wherein receiving a wellsite job status at a mobile user device in operative communication with said mobile monitoring platform further comprises:
   receiving through a scanned bar code indicative of a wellsite job status, said wellsite job status at a mobile user device in operative communication with said mobile monitoring platform.

8. The method of claim 1, wherein said communication network at least partially comprises a wireless communication network.

9. The method of claim 8, wherein said communication network at least partially comprises the Internet.

10. The method of claim 8, wherein said wireless communication network at least partially comprises a cellular communication network.

11. The method of claim 10, wherein said communication network at least partially comprises the Internet.

12. The method of claim 1, wherein said wellsite data further comprises wellsite environmental data and wellsite operation data.

13. The method of claim 12, wherein said one or more images further comprise a still video image and an infrared image.

14. The method of claim 12, wherein the wellsite environmental data comprises at least two of a wind velocity, a wind direction, an ambient air temperature, and a relative humidity.

15. The method of claim 12, wherein said wellsite operation data comprises at least two of:
- a wireless transmission signal strength measured by at least one of the transceiver and the controller;
- a mobile monitoring platform power capacity;
- a hydrogen sulfide ($H_2S$) level;
- a hoist load weight;
- a well pressure;
- a flow rate; and
- one or more fluid properties.

16. The method of claim 15, further comprising:
- monitoring the $H_2S$ level at or adjacent a wellbore;
- determining at said mobile monitoring platform that the $H_2S$ level at or adjacent the wellbore exceeds a predetermined level; and
- providing at least one of a visual and auditory alarm at the mobile monitoring platform indicative of the $H_2S$ level exceeding the predetermined level.

17. The method of claim 16, further comprising wirelessly transmitting, in real-time, a signal indicative of the $H_2S$ level exceeding the predetermined level from said mobile monitoring platform, wherein said signal is at least partially communicated through said communication network to said remote monitoring station.

18. A wellsite monitoring system, comprising:
- a plurality of sensors adapted to be positioned proximate a wellsite and to measure wellsite values from the wellsite; and
- a monitoring platform adapted to be transported to the wellsite, said platform comprising:
  - a controller;
  - a communication module coupled to said controller, said communication module configured to receive the measured wellsite values from the plurality of sensors;
  - a camera coupled to said controller, said camera configured to capture one or more images of the wellsite, wherein said communication module is configured to transmit the measured wellsite values in real-time; and
  - a processing module comprising at least one memory storage device adapted to store said one or more images, said communication module configured to transmit said one or more images in real-time;
- wherein the transmitted wellsite values and said one or more images are at least partially communicated through a communication network to a remote computing device.

19. The wellsite monitoring system of claim 18, wherein said communication network at least partially comprises the Internet.

20. The wellsite monitoring system of claim 18, wherein said communication network at least partially comprises a cellular communication network.

* * * * *